US011708900B2

(12) United States Patent
Weinl et al.

(10) Patent No.: US 11,708,900 B2
(45) Date of Patent: Jul. 25, 2023

(54) PARKING LOCK FOR AN AUTOMATIC TRANSMISSION IN A MOTOR VEHICLE

(71) Applicant: ZF Friedrichshafen AG, Friedrichshafen (DE)

(72) Inventors: Florian Weinl, Bodolz (DE); Sebastian Deeg, Fronreute-Blitzenreute (DE); Dirk Leutheuser, Langenargen (DE); Tobias Miller, Waldburg (DE); Arthur Strehlau, Friedrichshafen (DE); Julia Klein, Langenargen (DE); Matthias List, Friedrichshafen (DE); Armin Gierling, Langenargen (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 65 days.

(21) Appl. No.: 17/071,426

(22) Filed: Oct. 15, 2020

(65) Prior Publication Data
US 2021/0116026 A1 Apr. 22, 2021

(30) Foreign Application Priority Data
Oct. 16, 2019 (DE) ..................... 10 2019 215 948.6

(51) Int. Cl.
*F16H 63/34* (2006.01)
*F16H 63/36* (2006.01)
(Continued)

(52) U.S. Cl.
CPC ......... *F16H 63/3433* (2013.01); *F16H 61/36* (2013.01); *F16H 63/3483* (2013.01);
(Continued)

(58) Field of Classification Search
CPC .... F16H 63/3433; F16H 63/304; F16H 63/32; F16H 63/3483; F16H 63/3491;
(Continued)

(56) References Cited

U.S. PATENT DOCUMENTS 7,650,978 B2 1/2010 Ruhringer et al.
8,844,703 B2 9/2014 Jang et al.
(Continued)

FOREIGN PATENT DOCUMENTS

DE 102004030007 A1 3/2006
DE 102010043262 A1 5/2012
(Continued)

OTHER PUBLICATIONS

Schmidt, Thilo, et al. Machine Translation of DE102010043262. 2012 (Year: 2012).*
(Continued)

*Primary Examiner* — Lori Wu
(74) *Attorney, Agent, or Firm* — Dority & Manning, P.A.

(57) ABSTRACT

A parking lock includes a locking pawl (2) and an interlocking element (6) arranged on a connecting bar (5) to a selector lever (4). The end of the connecting bar (5) facing away from the interlocking element (6) is articulatedly connected to the selector lever (4). A hydraulically actuatable actuator (10) includes two pistons (11, 12) provided for disengaging the parking lock. During normal operation, a detent device (13), which is actuatable by an electromagnet (13*a*), locks the first piston (11) in a piston position corresponding to an engaged condition (P_ein) or a disengaged condition (P_aus). Without requiring activating the electromagnet (13*a*) to release the detent device (13), the parking lock, during normal operation, is manually disengagable with an emergency disengagement device (15) acting upon the second piston (12) and is manually engagable with an emergency engagement device (16) acting upon the detent device (13).

36 Claims, 23 Drawing Sheets

(51) Int. Cl.
  *F16H 61/36*   (2006.01)
  *F16H 63/38*   (2006.01)
(52) U.S. Cl.
  CPC ......... *F16H 63/3491* (2013.01); *F16H 63/36* (2013.01); *F16H 63/38* (2013.01); *F16H 63/3475* (2013.01)
(58) Field of Classification Search
  CPC .......... F16H 63/36; F16H 63/38; F16H 61/36; F16H 59/10
  See application file for complete search history.

(56) References Cited

U.S. PATENT DOCUMENTS

| 2004/0011609 | A1* | 1/2004 | Schmid ............... F16H 63/3433 188/158 |
| 2015/0219208 | A1* | 8/2015 | Albertson ............... F16H 61/22 74/473.23 |
| 2020/0248806 | A1 | 8/2020 | Klein |

FOREIGN PATENT DOCUMENTS

| DE | 102011057057 A1 | 1/2013 |
| DE | 102017218748 A1 | 4/2019 |

OTHER PUBLICATIONS

German Search Report DE102019215948.6, dated Jun. 22, 2020, (12 pages).

* cited by examiner

PARKING LOCK FOR AN AUTOMATIC TRANSMISSION IN A MOTOR VEHICLE

CROSS-REFERENCE TO RELATED APPLICATION

The present application is related and has right of priority to German Patent Application No. 10 2019 215 948.6 filed on Oct. 16, 2019, which is incorporated by reference in its entirety for all purposes.

FIELD OF THE INVENTION

The present invention relates generally to a parking lock for an automatic transmission in a motor vehicle.

BACKGROUND

A parking lock of an automatic transmission is known as a device which can secure the motor vehicle, in which the automatic transmission is installed, against rolling away. Appropriate parking lock mechanisms are widely known from the prior art. These parking lock mechanisms usually include a locking pawl, which is pivotably mounted on a pawl pin and can engage into or disengage from a parking interlock gear connected to the output shaft of the transmission, and an interlocking element arranged on a connecting bar to a selector lever mounted on a pin. In the interlocked condition, the interlocking element is clamped between the locking pawl and a guiding plate in order to prevent the locking pawl from being forced out of a tooth space of the parking interlock gear. In this case, the interlocking element is spring-loaded on the connecting bar with the aid of a spring element, wherein the end of the connecting bar facing away from the interlocking element is articulatedly connected to the selector lever. The engagement of the parking lock usually takes place mechanically with the aid of spring force of a spring, whereas the disengagement of the parking lock frequently takes place with the aid of compressive force of a hydraulic actuator. An actuator of this type usually includes a hydraulically actuated piston, which is arranged in the actuator housing so as to be axially displaceable against the force of the spring and whose piston rod is operatively connected to the selector lever, wherein the geometric position of the pivot points of the connecting bar and the piston rod at the selector lever defines the ratio between the piston movement and the connecting bar movement.

In order to be able to additionally lock the piston of the actuator in an engagement position, which is associated with the disengaged condition of the parking lock, an electromagnet is frequently provided, with the aid of which a detent mechanism acting upon the piston of the actuator can be actuated. This type of actuator is known, for example, from DE 10 2004 030 007 A1 of the applicant, wherein the detent mechanism and the electromagnet are matched to each other, in this case, in such a way that the detent mechanism mechanically locks the piston of the actuator in the engagement position associated with the disengaged condition of the parking lock when the electromagnet is de-energized, and so, in order to engage the parking lock, the electromagnet must be energized and the pressure chamber of the actuator must be vented, so that the interlocking element, which is generally designed as a locking cone, on the guiding plate can be displaced underneath the locking pawl, which then results in the form-locking engagement of the ratchet tooth of the locking pawl into a corresponding tooth space of the locking toothing of the parking interlock gear.

In this case, the detent mechanism includes a housing-affixed expanding cone and a piston rod-affixed snap-in cone and operates in the manner of a snap-in connection in such a way that the piston rod, upon disengagement of the parking lock, axially engages into the expanding cone and, in the process, goes through an axially acting snap-in connection and, due to this snap-in connection, the parking lock is held in the disengaged condition, wherein, in order to engage the parking lock, this expanding cone must be briefly radially spread open with the aid of a conical armature rod of the electromagnet, so that the previously preloaded spring can relax.

In the case of a failure of the control unit of the automatic transmission, the actuator remains in the previous position. In order to nevertheless be able to disengage the locking pawl from the interlocked position during a failure of the hydraulic pressure supply, DE 10 2004 030 007 A1 provides an emergency disengagement device including two manually actuatable levers, of which the first lever is operatively connected to the piston rod of the actuator, whereas the second lever is operatively connected to the detent mechanism. In order to be able to manually spread open the expanding cone of the detent mechanism from the outside, the armature rod of the electromagnet concentrically extends through the coil of the electromagnet, and so the second lever of the emergency disengagement device can axially displace the armature rod.

A similar actuating device of a parking lock including a hydraulic piston for disengaging the parking lock, an electromagnetically actuatable piston locking and emergency release including two levers is also known from DE 10 2011 057 057 A1.

DE 10 2017 218 748 A1 of the applicant describes a highly compact parking lock assembly, in which the connecting bar, together with the interlocking element of the parking lock, is arranged in parallel to the locking pawl and perpendicularly to a pawl pin inserted in the transmission housing. The locking pawl of the parking lock and the selector lever of the parking lock are pivotably mounted on the pawl pin. In this case, the end of the connecting bar positioned opposite the interlocking element is articulatedly connected to the selector lever.

In order to disengage this parking lock, a pressurizable hydraulic piston is provided, the piston rod of which is also articulatedly connected to the selector lever, so that each axial movement of the hydraulic piston brings about an axial movement of the connecting bar. In this case, the piston rod is electromagnetically lockable both in a first end position, which is associated with the "parking lock engaged" condition, and in a second end position, which is associated with the "parking lock disengaged" condition. In order to engage this parking lock, a spring is provided, which is tensioned between the transmission housing and the selector lever in such a way that a spring force acts counter to the piston force of the hydraulic piston and, for the case in which the hydraulic piston is not pressurized, turns the selector lever into a position that is associated with the "parking lock engaged" condition.

As a particular structural detail, the actuator includes two pistons, which are axially displaceably arranged on the same longitudinal axis in an actuator housing, and an electromagnetically actuatable detent device arranged in the actuator housing. Only the first piston can be hydraulically pressurized in order to disengage the parking lock and, upon pressurization, displaces the second piston in the axial direction against the spring force of the spring. The second piston is mechanically connected to the selector lever in such a way that an axial movement of the second piston brings about a rotation of the selector lever about a selector-lever axis of rotation, and vice versa. The detent device can be actuated by an electromagnet in such a way that the detent device mechanically locks the first piston either in a piston position associated with the engaged condition of the parking lock or in a piston position associated with the disengaged condition of the parking lock, when the electromagnet is not energized. Therefore, the electromagnet must be energized in order for the detent in the particular piston position to be released. Such a detent device is referred to by a person skilled in the art as a "bistable detent" of the first piston.

This specific design makes it possible to be able to mechanically disengage the locking pawl from the interlocked position of the locking pawl in the case of a failure of the hydraulic pressure supply of the automatic transmission with the aid of an emergency disengagement device, which can be manually operated from the outside and whose inner lever arranged within the transmission housing can be mechanically operatively connected to the selector lever of the parking lock, in a first embodiment, and to the piston rod of the second piston in a second embodiment. In the case of an actuation of the emergency disengagement device, the second piston is axially displaced by the selector lever, without the first piston leaving its locked piston position corresponding to the engaged condition of the parking lock.

SUMMARY OF THE INVENTION

Example aspects of the present invention further develop the parking lock for an automatic transmission, which is known from DE 10 2017 218 748 A1, which corresponds to U.S. Patent Publication No. 2020/0248806, the entirety of which is incorporated herein for all purposes.

Accordingly, example aspects of the invention are directed to a parking lock for an automatic transmission in a motor vehicle, which includes a parking interlock gear, which includes a locking toothing including tooth spaces and is connected to a transmission shaft in a torsion-proof manner; a locking pawl, which is pivotably mounted on a pawl pin and includes a ratchet tooth, which, in the engaged condition of the parking lock, engages into a tooth space of the locking toothing of the parking interlock gear and, in this way, interlocks the parking interlock gear and the transmission shaft against rotation; a selector lever, which is displaceable about a selector-lever axis of rotation in order to specify the engagement position of the parking lock; a connecting bar articulatedly connected to the selector lever and including an interlocking element, which is spring-mounted counter to the parking lock disengagement direction and, during the engagement of the parking lock, brings about the engagement of the ratchet tooth of the locking pawl into a tooth space of the locking toothing of the parking interlock gear and, in the engaged condition of the parking lock, prevents the ratchet tooth of the locking pawl from getting pushed out of the tooth space of the locking toothing of the parking interlock gear; a spring, the spring force of which acts upon the selector lever in the parking lock engagement direction; and a hydraulically actuatable actuator, the compressive force of which acts upon the selector lever in the parking lock disengagement direction. In this case, the end of the connecting bar facing away from the interlocking element is articulatedly connected to the selector lever.

The actuator includes two pistons, which are displaceably arranged, axially one behind the other, on the same longitudinal axis in an actuator housing. The first piston is hydraulically pressurizable in order to disengage the parking lock and, upon pressurization, displaces the second piston in the axial direction against the spring force of the spring. The second piston is mechanically connected to the selector lever in such a way that an axial movement of the second piston brings about a rotation of the selector lever about a selector-lever axis of rotation, and vice versa.

In order to secure the previously hydraulically disengaged parking lock against an unintentional engagement initiated by a pressure drop in the area of the actuator pressure medium supply, the parking lock includes an electromagnetically actuatable detent unit, with the aid of which the first piston of the actuator is mechanically locked in a piston position associated with the disengaged condition of the parking lock. In order to secure the previously engaged parking lock against an unintentional disengagement initiated by a fault-induced pressure control of the actuator, the electromagnetically actuatable detent unit also mechanically locks the first piston of the actuator in a piston position associated with the engaged condition of the parking lock.

In order to be able to also mechanically disengage the parking lock—which can only be hydraulically disengaged during normal operation of the automatic transmission—in the case of an emergency, an emergency disengagement device, which is manually operable from outside the automatic transmission, is provided, with the aid of which the second piston of the actuator can be axially displaced, without the need to activate the electromagnet of the detent device in order to release the detent device.

In order to be able to engage the parking lock in the case of an emergency, although the electromagnet of the detent device cannot be activated to release the detent device, the parking lock additionally includes, according to the invention, an emergency engagement device, which is manually operable from outside the automatic transmission, with the aid of which the detent device can be mechanically released from the detent position fixing the first piston of the parking lock actuator. Therefore, a manual actuation of the emergency engagement device has the effect that the first piston, which is now no longer locked, no longer prevents an axial movement of the second piston of the parking lock actuator preloaded by the spring, and so the parking lock is engaged with the aid of spring force of the spring, without the need to activate the electromagnet to release the detent device.

This design according to the invention expands the parking lock known from DE 10 2017 218 748 A1, in a particularly advantageous way, by the possibility to also be able to manually engage the parking lock in the case of an emergency, without the need to dispense with the advantages of the bistable locking of the piston of the parking lock actuator, which can be pressurized in order to disengage the parking lock.

In a first preferred example embodiment of the invention, the emergency disengagement device and the emergency engagement device of the parking lock are mechanically coupled to each other via a common, manually operable emergency control device in such a way that, starting from a basic control position associated with the normal operation of the automatic transmission, a first emergency control position is manually selectable, in which only the emergency engagement device is actuated, and that, starting from the first emergency control position, a second emergency control position is manually selectable, in which the emergency disengagement position is additionally actuated. Upon selection of the first emergency control position, a previously engaged parking lock remains in the engaged condition, whereas a previously disengaged parking lock is brought into the engaged condition by the spring force of the spring during the actuation of the emergency engagement device, without the electromagnet being activated to release the detent device for this purpose. Upon selection of the second emergency control position, the parking lock, which is now engaged in any case, is manually brought into the disengaged condition against the spring force of the spring.

An essential advantage of this first example embodiment of the invention results due to the predefined operating sequence during the manual actuation of the emergency control device shared by the emergency engagement device and the emergency disengagement device. The operating sequence, which is predefined in this case and in which the operator initially always engages the parking lock upon actuation of the emergency control device, secures the motor vehicle against unintentionally rolling way in the event of an inadvertent transient actuation of the emergency control device.

In one preferred design of this first example embodiment, the common emergency control device is moved in a rotary manner during the changeover from the basic control position into the first emergency control position and vice versa, but is moved in a translatory manner during the changeover from the first emergency control position into the second emergency control position and vice versa. In the knowledge that the manual emergency engagement of the parking lock requires a greater actuation force than the manual release of the interlocking of the parking lock actuator, the kinematics provided here advantageously take into account the fact that a greater force can be transmitted with a manual pulling motion than with a manual turning motion. The specification of different hand motions for actuating the emergency engagement device and the emergency disengagement device helps the operator to recognize the different devices and to keep them apart. Bowden cables and other pull and push mechanisms, for example, are suitable as an operative connection between this emergency control device, which is preferably designed in the manner of a hand lever and can be operated from within the interior space of the motor vehicle, and the particular pivot points of the emergency disengagement device and the emergency engagement device in the area of the parking lock actuator.

In order to further increase the reliability in service, it is provided for this purpose, in one example refinement, that the parking lock additionally includes means that prevent a start of a prime mover of the motor vehicle, which is provided for driving the automatic transmission, in the second emergency control position, in which the motor vehicle is not secured against rolling away by way of an engaged parking lock and, in the case of a force-fit connection in the automatic transmission, could possibly, undesirably, pull away from rest. This type of means can be, for example, an integral part of the emergency control device, for example, in the form of a release button, which is blocked in the second emergency control position and which must be pressed in order to be able to start the starter of the prime mover.

In particular for the case in which a common, manually operable emergency control device is provided for the emergency disengagement device and the emergency engagement device of the parking lock, whose manually operable actuating mechanism is arranged in the interior space of the motor vehicle, it is useful that an actuating element (designed, for example, as a Bowden cable) of the emergency disengagement device acting upon the second piston of the actuator during the emergency disengagement of the parking lock as well as an actuating element (designed, for example, as a Bowden cable) of the emergency engagement device acting upon the detent device during the emergency engagement of the parking lock extend through a housing wall of a transmission housing of the automatic transmission.

If—as provided above—a common, manually operable emergency control device for the emergency disengagement device and the emergency engagement device of the parking lock is provided with two emergency control positions, it is useful to equip this emergency control device with a haptic interlock, which must be overcome in order to exit the first emergency control position. The emergency control device can also include an additional haptic interlock, which must be overcome in order to exit the basic control position of the emergency control device associated with the normal operation of the automatic transmission. In this case, it is useful to design the common emergency control device in such a way that the common emergency control device can lock in the first and second emergency control positions and, if necessary, also in the basic control position.

If—as provided above—a common, manually operable emergency control device for the emergency disengagement device and the emergency engagement device of the parking lock is provided with two emergency control positions, it is also useful to provide the emergency engagement device with an emergency interlock compensation spring, which operates as a travel and/or force limiter during and/or after the release of the detent device from the locked position.

In a second preferred example embodiment of the invention, the emergency disengagement device and the emergency engagement device of the parking lock are mechanically coupled to each other via a common, manually operable emergency control device in such a way that, starting from a basic control position associated with the normal operation of the automatic transmission, either the emergency disengagement device or the emergency engagement device of the parking lock is manually selectable.

Preferably, an inner lever arranged within the transmission housing is provided for this purpose. The inner lever is connected, in a torsion-proof manner, to a manually actuatable outer lever arranged outside the transmission housing and is designed for either, depending on its engagement position:
  releasing the detent device of the parking lock actuator fixing the first piston of the parking lock actuator, which results in the mechanical engagement of the parking lock, without the need to electrically actuate the electromagnet acting upon the detent device;
  exerting no influence upon the parking lock; or
  moving the second piston of the parking lock actuator together with the selector lever acting upon the parking pawl in a manner resulting in the disengagement of the parking lock, which results in the mechanical disengagement of the parking lock, without the need to release the detent device from the detent position fixing the first piston of the parking lock actuator.

In addition, it is useful to equip the emergency control device with an additional haptic interlock, which must be overcome in order to exit the basic control position of the inner and outer levers of the emergency control device associated with the normal operation of the automatic transmission.

An essential advantage of these two example embodiments of the invention results due to the different actuation directions for the manual emergency engagement and emergency disengagement of the parking lock. As a result, the operation of the control element shared by the emergency engagement device and the emergency disengagement device is particularly free from the risk of being mixed up by the operator. In addition, the design is distinguished by its robustness.

In a third preferred example embodiment of the invention, the emergency disengagement device and the emergency engagement device of the parking lock are manually operable independently of each other. In this case, the emergency disengagement device and the emergency engagement device each include a separate actuating device, which is preferably manually operable from within the interior space of the motor vehicle and is designed, for example, as a Bowden cable or a push mechanism. In this case, it can also be provided that the emergency disengagement device is accessible from a location in the interior space of the motor vehicle that differs from that of the emergency engagement device and, in particular, is more difficult to access. A person skilled in the art has a great deal of freedom with regard to the structural design and arrangement of the two hand levers.

For the case as well in which the emergency disengagement device and the emergency engagement device of the parking lock are manually operable from different locations in the interior space of the motor vehicle, it is useful when an actuating element (designed, for example, as a Bowden cable) of the emergency disengagement device acting upon the second piston of the actuator during the emergency disengagement of the parking lock as well as an actuating element (designed, for example, as a Bowden cable) of the emergency engagement device acting upon the detent device during the emergency engagement of the parking lock extend through a housing wall of a transmission housing of the automatic transmission. Alternatively, it can also be provided, however, that only the actuating element of the emergency disengagement device acting upon the second piston of the actuator during the emergency disengagement of the parking lock extends through a housing wall of a transmission housing of the automatic transmission, whereas the actuating element of the emergency engagement device acting upon the detent device during the emergency engagement of the parking lock extends through a wall of an oil pan of the automatic transmission.

An essential advantage of this third example embodiment of the invention is great freedom for the design engineer with respect to the selection and arrangement of the separate actuating elements of the emergency engagement device and the emergency disengagement device.

In one preferred design of all three above-described example embodiments according to the invention, the emergency engagement device mechanically acts upon an armature rod of the electromagnet and, via the armature rod, upon the detent device during the emergency engagement of the parking lock. In a first refinement thereof, it is provided that the emergency engagement device acts upon the side of the armature rod facing away from the second piston during the emergency engagement of the parking lock.

In this case, it can be provided, for example, that the emergency engagement device includes a lever for actuating the armature rod, which is articulatedly connected to a housing of the electromagnet and includes two opposite free ends, wherein the first free end of the lever is articulatedly connected to the armature rod of the electromagnet, whereas the second free end of the lever includes a supporting fixture for an actuator of the emergency engagement device. In order to decouple this actuator, in a structurally simple way, from the lever and, therefore, from the armature rod during normal operation, the actuator is inserted into the lever preferably with an open space that is greater than the axial displacement of the electromagnet upon energization, so that an energization of the electromagnet during normal operation does not result in a movement of the actuator.

A suitable option for an actuator is, for example, an inner cable of a Bowden cable, whose sheath rests against the housing of the electromagnet or against the actuator housing. Another suitable option for an actuator is a push rod, which is preferably axially displaceably mounted at the actuator housing and/or at the housing of the electromagnet, but also a pull rod, which is preferably axially displaceably mounted at the actuator housing and/or at the housing of the electromagnet.

In a first alternative, it can be provided, for example, that the emergency engagement device includes a lever for actuating the armature rod, which is articulatedly connected to a housing of the electromagnet and includes two opposite free ends, wherein the first free end of the lever loosely engages into a driving section of the armature rod of the electromagnet, whereas an actuator of the emergency engagement device is inserted at the second free end of the lever. In this case, the driving section of the armature rod has a length, as viewed in the longitudinal direction of the armature rod, that is greater than the axial displacement of the electromagnet upon energization, so that an energization of the electromagnet during normal operation does not bring about a swiveling motion of the lever. This also allows for an effective decoupling of the electromagnet and the actuator during normal operation of the automatic transmission.

Suitable options for the actuator of the emergency engagement device are an inner cable of a Bowden cable, whose sheath rests against the housing of the electromagnet or against the actuator housing, a push rod, which is preferably axially displaceably mounted at the actuator housing and/or at the housing of the electromagnet, and a pull rod, which is preferably axially displaceably mounted at the actuator housing and/or at the housing of the electromagnet.

In a second alternative, it can be provided, for example, that the emergency engagement device includes a cup-shaped sleeve for actuating the armature rod, which is axially displaceably mounted on or at the electromagnet and at least partially concentrically surrounds the electromagnet, wherein the cup base of the sleeve is fixedly connected to the armature rod of the electromagnet, whereas a shell surface of the sleeve is operatively connected to an actuator of the emergency engagement device. Upon actuation of the emergency engagement device, the actuator axially displaces the sleeve and, therefore, also the armature rod so far that the detent device exits its detent position. During normal operation, however, the armature rod of the electromagnet transfers no axial loads onto the actuator upon energization. This actuator is preferably designed as a push rod, alternatively, for example, as a pull rod or as an inner cable of a Bowden cable.

This design is suitable, in particular, for the case in which only very little installation space is available behind the electromagnet—i.e., on the side of the armature rod facing away from the second piston of the actuator—for the coupling of the additional emergency engagement device at the armature rod. The fact that the electromagnet must be designed to be slightly stronger as compared to a basic design known from the prior art in order to displace the armature and the sleeve is technically easily implemented.

As the actuator of the emergency engagement device, a push rod is preferably provided in this case, which extends axially parallel to the armature rod and is preferably axially displaceably mounted at the actuator housing and/or at the housing of the electromagnet. Alternatively, the actuator can also be designed as a pull rod, however, which is preferably axially displaceably mounted at the actuator housing and/or at the housing of the electromagnet, or also as the inner cable of a Bowden cable, whose sheath rests against the housing of the electromagnet or against the actuator housing.

In a third alternative, it is provided that the emergency engagement device for actuating the armature rod includes a cup-shaped sleeve, which is axially displaceably mounted on or at the electromagnet and at least partially concentrically surrounds the electromagnet, wherein the armature rod of the electromagnet extends centrally through the cup base of the sleeve in an axially displaceable manner. A driving device cooperating with the cup base of the sleeve, via which the sleeve can axially displace the armature rod, is provided at the end of the armature rod extending through the cup base of the sleeve. Therefore, this driving device includes a mating surface cooperating with the cup base of the sleeve, which, in the mounted condition, is arranged on the side of the cup base facing away from the electromagnet. In order to decouple the sleeve, in a structurally simple way, from the armature rod during normal operation, an open space is provided axially between the cup base of the sleeve and the mating surface of the driving device of the armature rod, which is greater than the axial displacement of the electromagnet upon energization, so that an energization of the electromagnet during normal operation does not result in an axial movement of the sleeve. In order to displace the sleeve in the axial direction of the armature rod, the emergency engagement device includes an actuator, which acts upon the shell surface of the sleeve upon actuation of the emergency engagement device.

As is the case with respect to the second alternative, the actuator is preferably designed as a push rod in this case, which extends axially parallel to the armature rod and is preferably axially displaceably mounted at the actuator housing and/or at the housing of the electromagnet. Alternatively, the actuator can also be designed as a pull rod, however, which is preferably axially displaceably mounted at the actuator housing and/or at the housing of the electromagnet, or also as the inner cable of a Bowden cable, whose sheath rests against the housing of the electromagnet or against the actuator housing. In contrast to the second alternative, the axial installation length of the device is slightly greater, but no reinforcement measures are necessary at the electromagnet for this purpose.

In a fourth alternative, it is provided that the emergency engagement device for actuating the armature rod includes a selector fork, which is axially displaceably arranged on the side of the electromagnet facing away from the detent device and, via a forked end of the selector fork, is loosely hung into a driving device of the armature rod, so that the selector fork can axially displace the armature rod via the driving device. The armature rod axially displaceably extends through the forked end of the selector fork as viewed in the axial direction of the armature rod, wherein a predefined open space is provided axially between the forked end of the selector fork and the driving device of the armature rod, which is greater than the axial displacement of the electromagnet upon energization, so that an energization of the electromagnet during normal operation does not result in an axial movement of the selector fork. In order to displace the selector fork in the axial direction of the armature rod, the emergency engagement device includes an actuator, which acts upon the end of the selector fork opposite the forked end upon actuation of the emergency engagement device. This actuator is preferably designed as a push rod, which extends axially parallel to the armature rod and is preferably axially displaceably mounted at the actuator housing and/or at the housing of the electromagnet and is fixedly connected to the selector fork at the end of the selector fork that is opposite the forked end of the selector fork.

As explained above, in one preferred design of all three above-described example embodiments according to the invention, the emergency engagement device mechanically acts upon an armature rod of the electromagnet and, via the armature rod, upon the detent device during the emergency engagement of the parking lock. In a second refinement, it is provided that the emergency engagement device acts upon the side of the armature rod facing the second piston of the actuator during the emergency engagement of the parking lock. Preferably, the emergency engagement device for actuating the armature rod includes an actuating rod, which centrally extends through the piston rod of the second piston, which allows for an extremely compact, readily accessible expansion of the parking lock known from DE 10 2017 218 748 A1, which is associated with only low additional costs. In this case, it is useful and advantageous when this actuating rod is axially displaceably mounted in the second piston or in the piston rod of the second piston.

In this type of design, in order to minimize the transversal loads introduced into the second piston of the actuator in the area of the driving part between the piston rod of the second piston and the selector lever, it is advantageous when the selector lever includes a U-shaped driving section including two plane-parallel legs, in the area of which the piston rod and the selector lever are connected to each other, wherein, as viewed in the axial direction of the piston rod, the piston rod then extends between these two plane-parallel legs of the selector lever.

In another refinement of the invention, it is provided that, upon actuation of the emergency disengagement device, an inner lever of the emergency disengagement device, which is arranged within a transmission housing of the automatic transmission, acts mechanically directly upon the selector lever. Alternatively, it can be provided that, upon actuation of the emergency disengagement device, an inner lever of the emergency disengagement device, which is arranged within a transmission housing of the automatic transmission, acts mechanically directly upon the piston rod of the second piston, so that the inner lever acts upon the selector lever via the piston rod.

In one further refinement of the invention, it is provided that the electromagnet must be electrically energized in order to release the detent device from the locked position in the particular piston position. Alternatively, it can be provided that the electromagnet can be electrically de-energized in order to release the detent device from the locked position in the particular piston position.

BRIEF DESCRIPTION OF THE DRAWINGS

The invention is explained in greater detail in the following, by way of example, with reference to the attached figures. Wherein.

DETAILED DESCRIPTION

Figure 1:
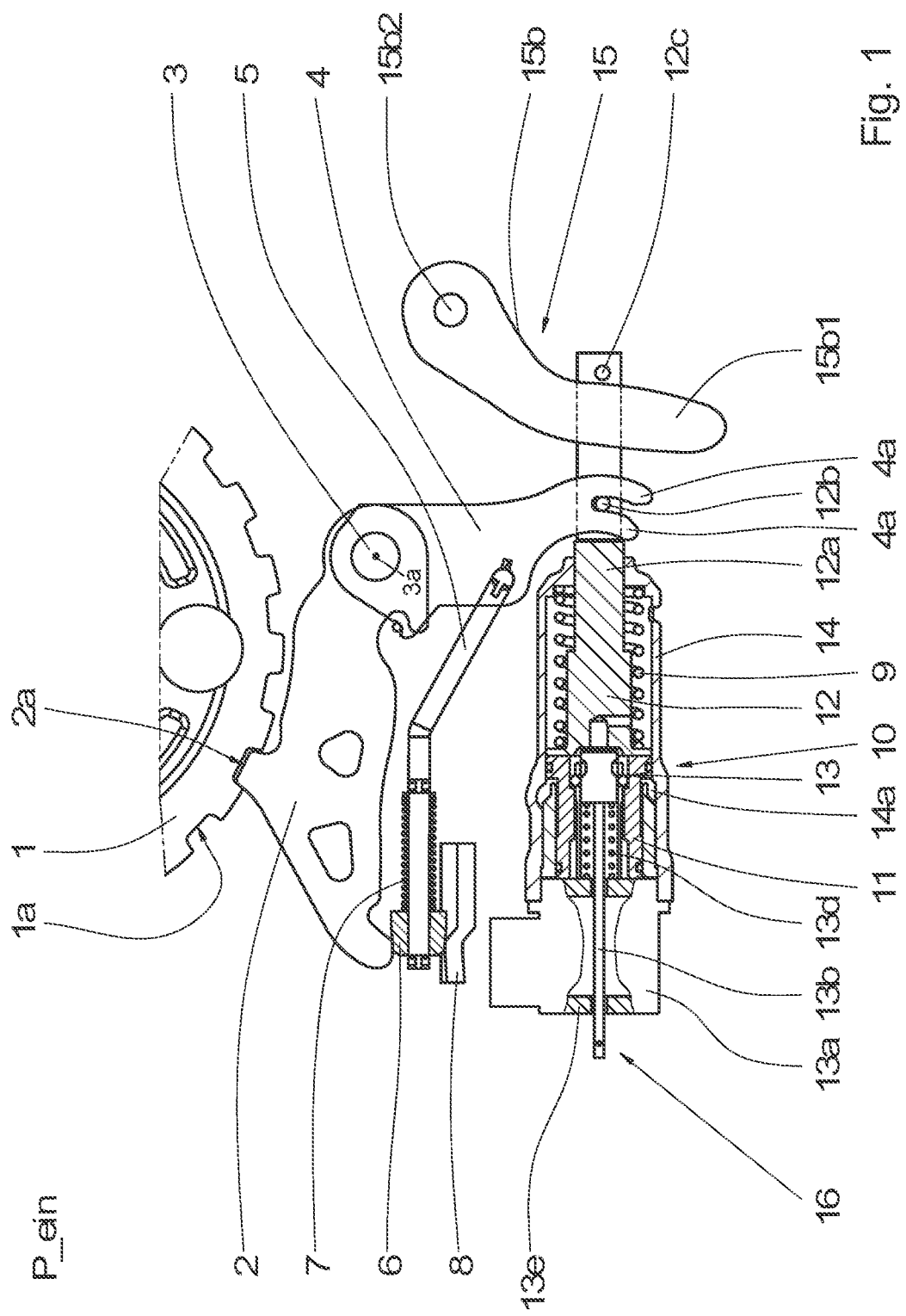
FIG. 1 shows a diagrammatic sectioning of a first exemplary embodiment of a parking lock according to the invention in the "parking lock engaged" engagement position.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

Figure 2:
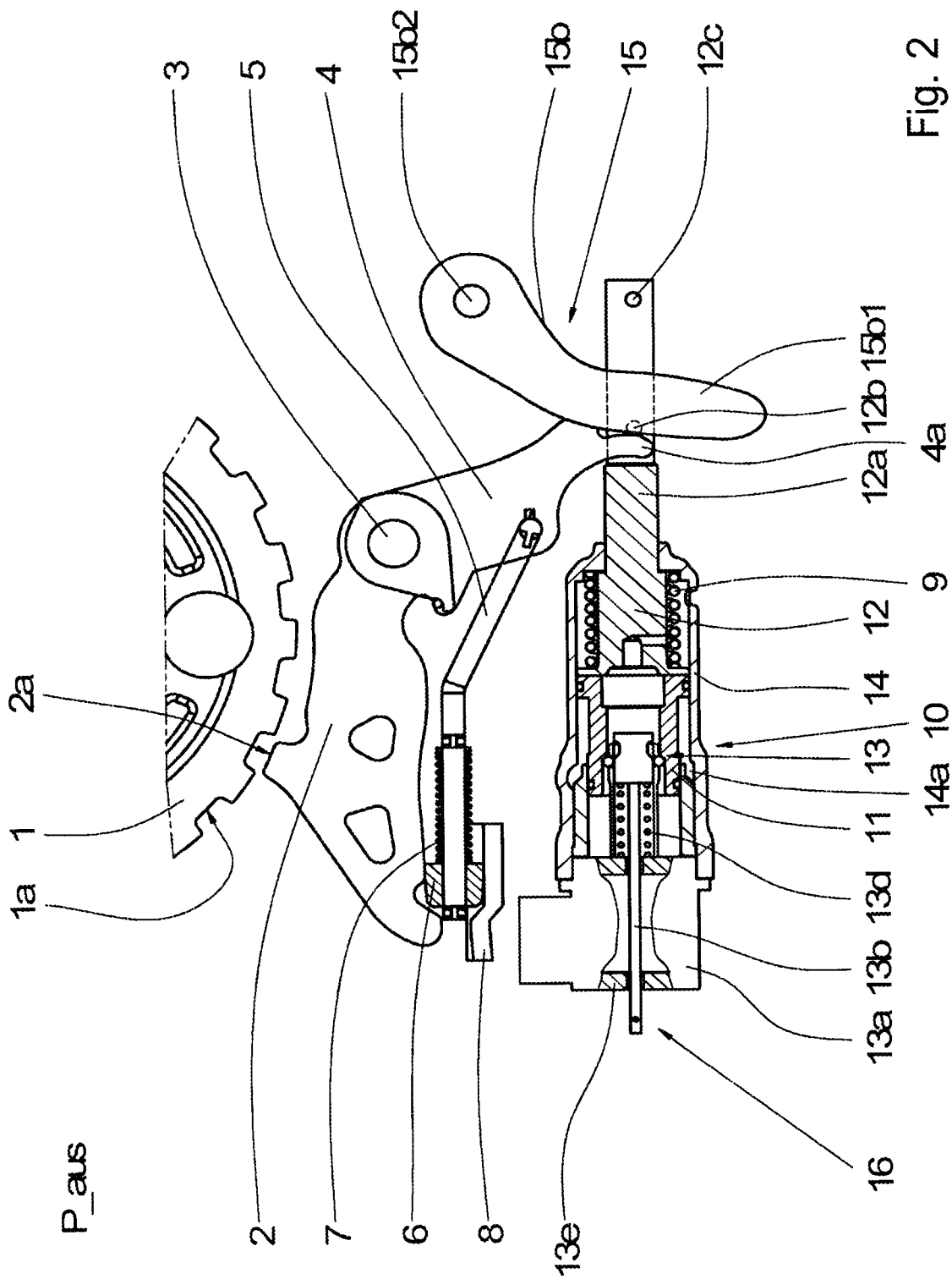
FIG. 2 shows a diagrammatic sectioning of the parking lock according to FIG. 1 in the "parking lock disengaged" engagement position.
Figure 3:
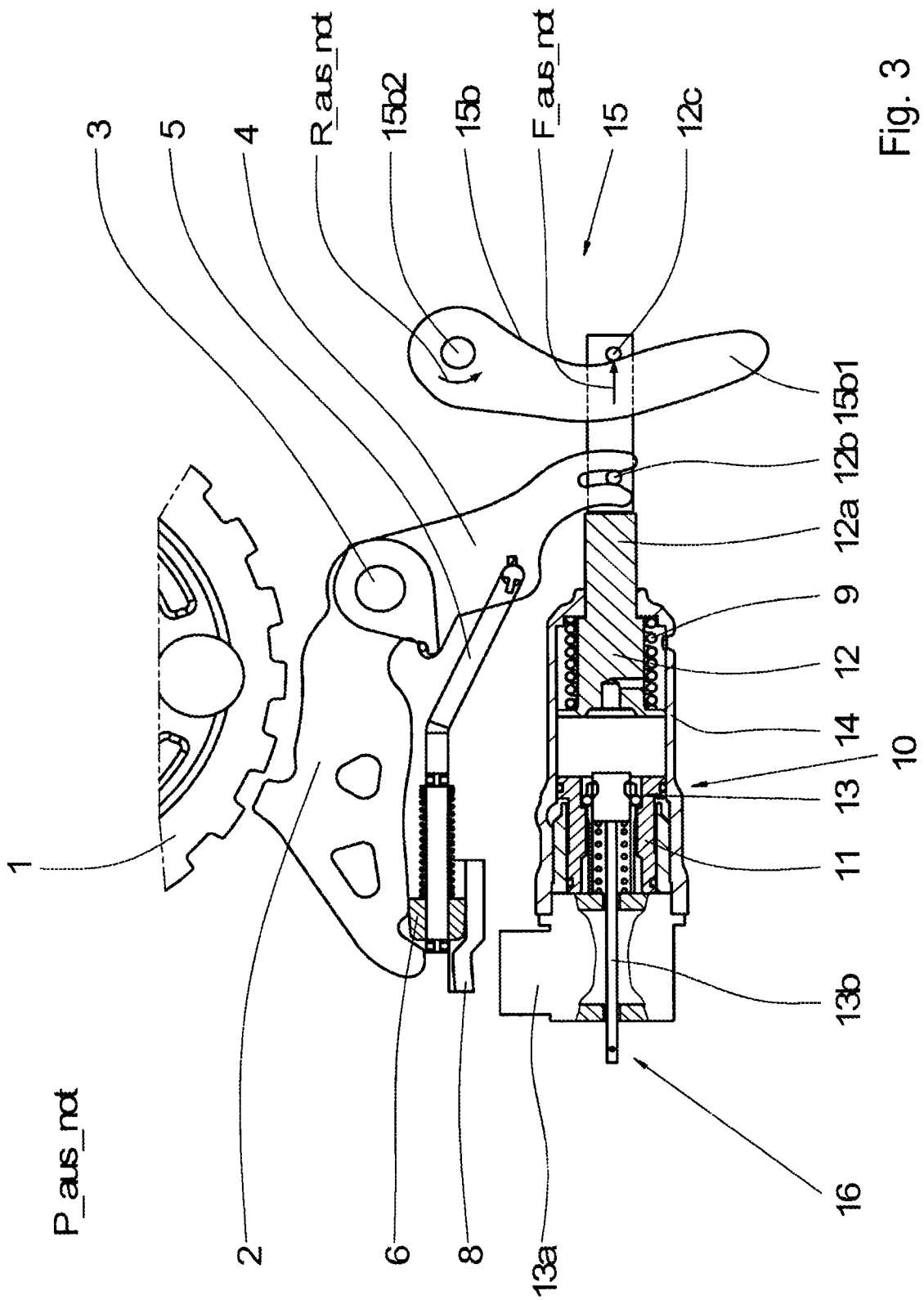
FIG. 3 shows a diagrammatic sectioning of the parking lock according to FIG. 1 in the "parking lock emergency-released" engagement position.
Figure 4:
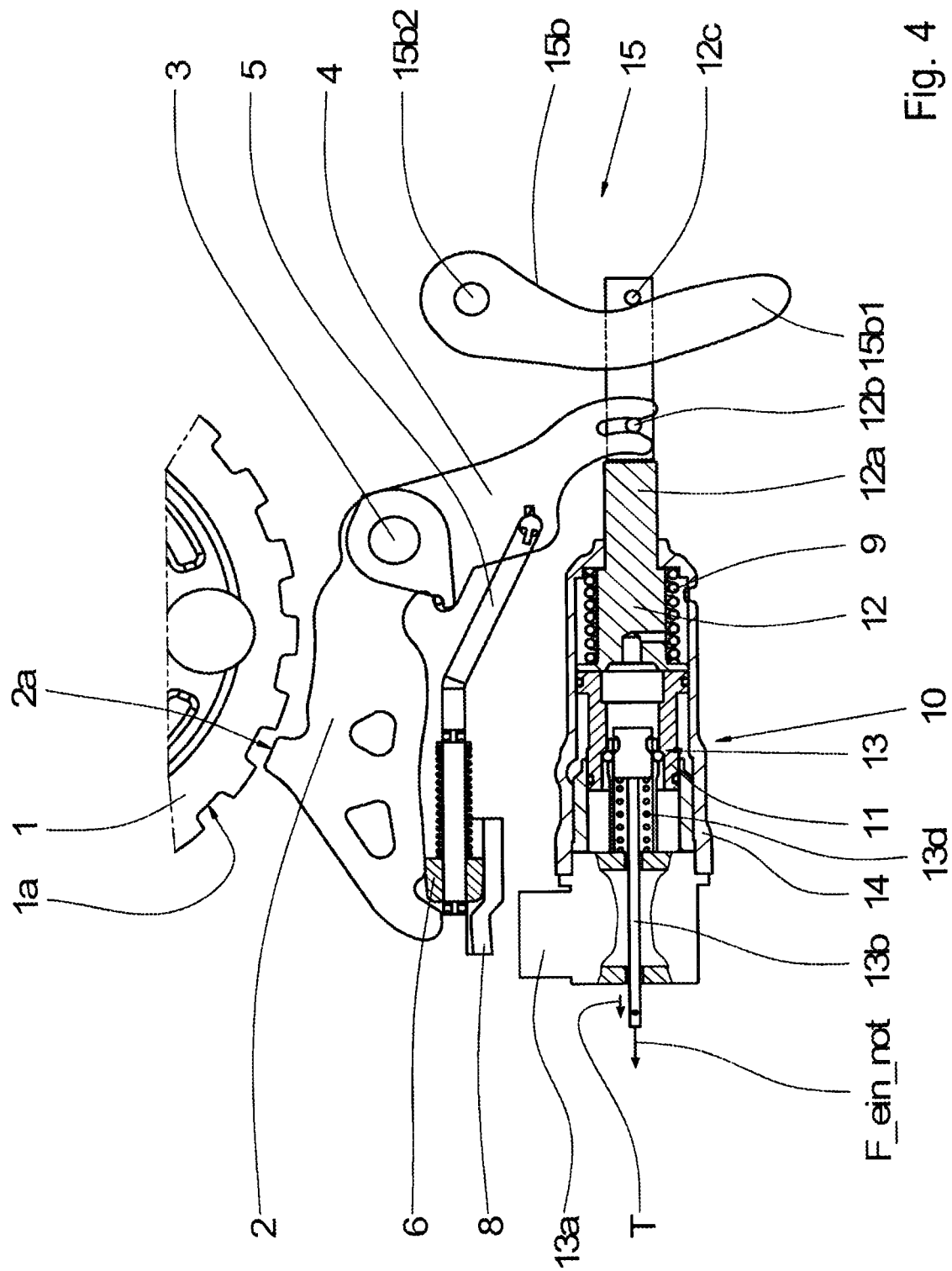
FIG. 4 shows a diagrammatic sectioning of the parking lock according to FIG. 1 upon actuation of the emergency engagement device.
Figure 5:
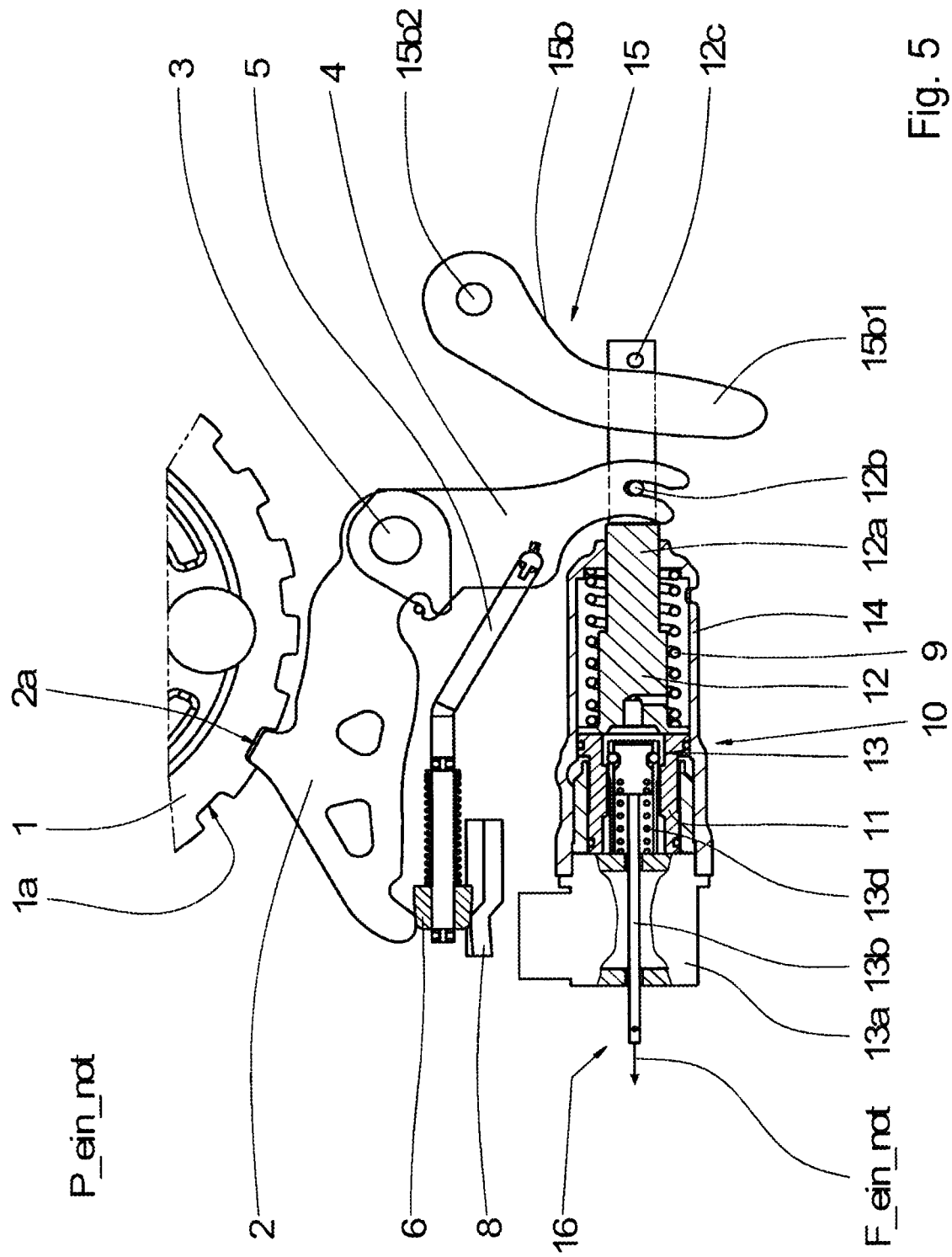
FIG. 5 shows a diagrammatic sectioning of the parking lock according to FIG. 1 in the "parking lock emergency-interlocked" engagement position.

A first exemplary embodiment of a parking lock according to example aspects of the invention for an automatic transmission of a motor vehicle is described in greater detail in the following and with reference to FIGS. 1 through 5. The first exemplary embodiment of a parking lock according to example aspects of the invention is based on the parking lock design from DE 10 2017 218 748 A1, although, according to the invention, the parking lock includes an emergency engagement device in addition to the emergency disengagement device known from the prior art. FIG. 1 shows a sectioning of this parking lock during normal operation of the automatic transmission in the "parking lock engaged" engagement position, indicated by the reference character P_ein. FIG. 2 shows a sectioning of this parking lock during normal operation of the automatic transmission in the "parking lock disengaged" engagement position, indicated by the reference character P_aus. FIG. 3 shows a sectioning of this parking lock during emergency operation of the automatic transmission in the "parking lock emergency-released" engagement position, indicated by the reference character P_aus_not. Finally, FIG. 4 shows a sectioning of this parking lock upon actuation of the emergency engagement device, whereas FIG. 5 shows a sectioning of this parking lock during emergency operation of the automatic transmission in the "parking lock emergency-interlocked" engagement position, indicated by the reference character P_ein_not.

The parking lock shown in FIGS. 1 through 5 includes a locking pawl 2, which is pivotably mounted on a pawl pin 3 and the ratchet tooth 2a of which engages into a tooth space 1a of a parking interlock gear 1 connected to the transmission shaft (not represented in greater detail here) of the automatic transmission depending on the engagement position of the parking lock. In addition, this parking lock includes an interlocking element 6, which is arranged on a connecting bar 5 to a selector lever 4 and is spring-mounted via a spring element 7. In the interlocked condition—corresponding to the "parking lock engaged" or "parking lock emergency-interlocked" engagement condition—the interlocking element 6 is clamped between the locking pawl 2 and a transmission housing-affixed guiding plate 8 in order to prevent the ratchet tooth 2a from being pushed out of the corresponding tooth space 1a of the parking interlock gear 1. The interlocking element 6, which is spring-mounted counter to the parking lock disengagement direction, is designed as a locking cone, by way of example. The selector lever 4 is displaceably mounted on the pawl pin 3 in an installation space-saving manner, and so the pawl pin longitudinal axis, the locking pawl pivot axis, and the selector-lever axis of rotation are identical. The end of the connecting bar 5 facing away from the interlocking element 6 is articulatedly connected to the selector lever 4. In order to be able to engage and disengage the parking lock, the selector lever 4 includes a driving part 4a, which is connected to a hydraulically actuatable actuator 10, with the aid of which the engagement position of the parking lock can be specified during normal operation of the automatic transmission.

As an important design feature, the actuator 10 includes two pistons 11 and 12, which are axially displaceably arranged on the same longitudinal axis, one behind the other in the axial direction, in an actuator housing 14, of which only the first piston 11 can be hydraulically pressurized in order to disengage the parking lock. Upon pressurization, the first piston 11 displaces the second piston 12 in the axial direction against the spring force of a spring 9, which is designed as a compression spring mounted axially between the second piston 12 and the actuator housing 14 and, as viewed axially, concentrically surrounds a piston rod 12a of the second piston 12. The second piston 12 is mechanically connected to the selector lever 4 via a pin 12b, which is inserted into the piston rod 12a and engages into the driving part 4a of the selector lever 4, so that an axial movement of the second piston 12 brings about a rotation of the selector lever 4 about the selector-lever axis of rotation 3a. On the other hand, a rotation of the selector lever 4 about the axis of rotation 3a also always brings about an axial movement of the second piston 12.

In addition, the actuator 10 includes a bistable detent device 13 for the first piston 11, which is arranged within the actuator housing 14—centrally within the first piston 11, by way of example, in this case—and can be electromagnetically actuated by way of an electromagnet 13a, which is arranged at the actuator housing 14, in such a way that the detent device 13 mechanically locks the first piston 11 either in a piston position associated with the engaged condition P_ein of the parking lock or in a piston position associated with the disengaged condition P_aus of the parking lock, when the electromagnet 13a is not energized. The electromagnet 13a must be energized in order to release the detent in the particular piston position of the first piston 11.

In this case, the parking lock includes an emergency disengagement device, which is marked by the reference character 15 and with the aid of which the parking lock can be mechanically transferred from the condition P_ein into the condition P_aus in the event of failure of the hydraulic and/or electrical control of the actuator 10. For this purpose, the emergency disengagement device 15 can be mechanically brought into an operative connection with the piston rod 12a of the second piston 12 of the actuator 10. For this purpose, the emergency disengagement device 15 includes an inner lever 15b arranged in the interior space of the transmission housing as well as an outer lever (not represented in greater detail here) outside the transmission housing of the automatic transmission, wherein the inner lever 15b and the outer lever are connected to each other in a torsion-proof manner via a shaft 15b2 extending through the transmission housing and are pivotably mounted at or in the transmission housing via this shaft 15b2.

As is apparent in FIG. 3, in the case of a manual actuation of the emergency disengagement device 15 in the direction of rotation R_aus_not, a leg 15b1 of the inner lever 15b transmits a force F_aus_not, which results in the disengagement of the parking lock, via a pin 12c, which is fixedly inserted into the piston rod 12a of the second piston 12 of the actuator 10, onto the piston rod 12a and, from the piston rod 12a, via the pin 12b, which is likewise fixedly inserted into the piston rod 12a, onto the selector lever 4, regardless of the position of the first piston 11 of the actuator 10. With respect to the amount, this force F_aus_not must be greater than the sum of the spring force of the spring 9 and the frictional forces in the actuating system of the locking pawl 2.

In order to be able to release the detent device 13, during normal operation of the automatic transmission, from the detent position, in which the detent device 13 mechanically interlocks the first piston 11 of the actuator 10 against axial movement with the aid of a ball lock, the electromagnet 13a includes an armature rod 13b, which is axially displaceable with the aid of an electrical actuation of a coil of the electromagnet 13a. In the exemplary embodiment represented here, an energization of the coil of the electromagnet 13a results in the release of the detent device 13 from the detent position; alternatively, an inverting interconnection is possible, in which the coil, in the energized condition, holds the detent device 13 in the detent position. In addition, the armature rod 13b is equipped with a recoil spring 13d, in order to bring about an automatic return of the armature rod 13b into a starting position, which sets in during normal operation when the electromagnet 13a is not energized, and which sets in during emergency operation when the emergency engagement device 16 is deactivated. A low spring force is sufficient for such an automatic return.

According to the first exemplary embodiment of a parking lock according to the invention, the armature rod 13b of the electromagnet 13a acting upon the detent device 13 is manually axially displaceable with the aid of the emergency engagement device 16, so that a manual actuation of the emergency engagement device 16 results in the release of the detent device 13, with the result that the first piston 11 of the actuator 10, which was previously interlocked in a piston position associated with the disengaged condition of the parking lock, now no longer interlocks the second piston 12 of the actuator 10 and the spring force of the spring 9 acting upon the second piston brings the second piston 12 and the selector lever 4, which is mechanically connected to the second piston 12, into a position associated with the engaged condition of the parking lock, which has the result that the locking pawl 2 engages, in a form-locking manner, via its ratchet tooth 2a into a tooth space 1a of the parking interlock gear 1.

As a result, the armature rod 13b extends completely through the electromagnet 13a as viewed in the axial direction, i.e., extends through the housing (13e) of the electromagnet 13a on both sides of the coil, wherein the end of the armature rod 13b facing the detent device 13 is designed in the same way as in the prior art, whereas the end of the armature rod 13b facing away from the detent device 13 is now provided with a receptacle for an actuating element of the emergency engagement device 16, in this case, by way of example, with a bore hole for securing a pull mechanism (not represented in greater detail here), for example, a Bowden cable, which is manually operable from outside the automatic transmission, preferably from within the interior space of the motor vehicle. In the engagement position shown in FIG. 4, the armature rod 13b is acted upon, with the aid of the emergency engagement device 16, by a pulling force F_ein_not, which has pulled the armature rod 13b into a position, in which the detent device 13 designed as a ball stop in this case, by way of example, has released the axial movement of the first piston 11 of the actuator 10, so that subsequently—as shown in FIG. 5—the parking lock is engaged with the aid of spring force of the spring 9. With respect to the amount, the force F_aus_not must be greater than the sum of the spring force of the armature rod recoil spring 13d, the frictional forces of the armature rod mounting, and a magnetic force that may still be acting upon the armature rod 13b.

According to the first exemplary embodiment of a parking lock according to the invention, the emergency disengagement device 15 and the emergency engagement device 16 can therefore be operated independently of each other.

For this purpose, it can be provided that the actuating element of the emergency disengagement device 15 acting upon the second piston 12 of the actuator 10 during the emergency disengagement of the parking lock, as well as the actuating element of the emergency engagement device 16 acting upon the detent device 13 during the emergency engagement of the parking lock extend through a housing wall of a transmission housing (not represented in greater detail here) of the automatic transmission at different points. Depending on the spatial position of the actuator 10 within the transmission housing, it can also be useful, alternatively, that only the actuating element of the emergency disengagement device acting upon the second piston 12 of the actuator 10 during the emergency disengagement of the parking lock extends through the housing wall of the transmission housing, whereas the actuating element of the emergency engagement device 16 acting upon the detent device 13 during the emergency engagement of the parking lock extends through a wall of an oil pan (also not represented in greater detail here) of the automatic transmission.

In order to be able to manually displace the armature rod 13$b$ of the electromagnet 13$a$ in the axial direction from the side facing away from the detent device 13, a person skilled in the art will also provide deflecting devices, if necessary, in order to implement the mechanical operative connection necessary between the armature rod 13$b$ and a hand lever of the emergency engagement device 16 at another point from within the interior space of the automatic transmission. In the following and with reference to FIGS. 6 through 11, multiple examples thereof are explained in greater detail, wherein the electromagnet 13$a$ is represented in a simplified manner in all these examples.

Figure 6:
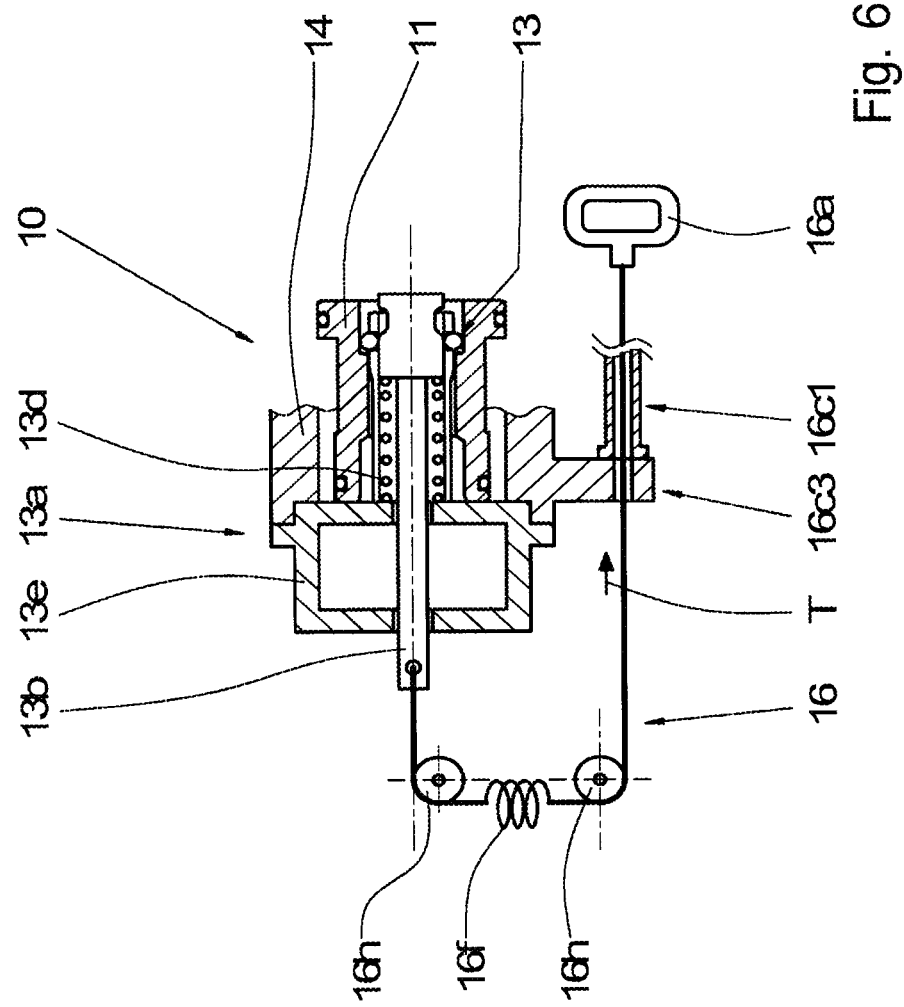
FIG. 6 shows a first variant of a component design of the parking lock according to FIG. 1.

In the first variant represented in FIG. 6, the deflecting device for axially displacing the armature rod 13$b$ of the electromagnet 13$a$ is designed as roller deflection, in this case, by way of example, including two rollers 16$h$, which are designed for guiding a Bowden cable 16$c$1, whose inner cable is connected to the end of the armature rod 13$b$ that is opposite the detent device 13 acting upon the first piston 11 of the actuator 10. If the inner cable of the Bowden cable 16$c$1 is manually pulled in the translation direction T with the aid of the actuating element 16$a$ of the emergency engagement device 16 of the parking lock, which is designed as a hand lever in this case, by way of example, the armature rod 13$b$ releases the detent device 13 from the detent position. The Bowden cable 16$c$1 rests, with a sheath of the Bowden cable 16$c$1, via a counter support 16$c$3 against the actuator housing 14. In the exemplary embodiment represented here, a specific elasticity, in the form of a compensation spring 16$f$, is additionally provided in the inner cable of the Bowden cable 16$c$1. This compensation spring 16$f$ operates in the manner of a travel and force limiter and is utilized for protecting the electromagnet 13$a$.

Figure 7:
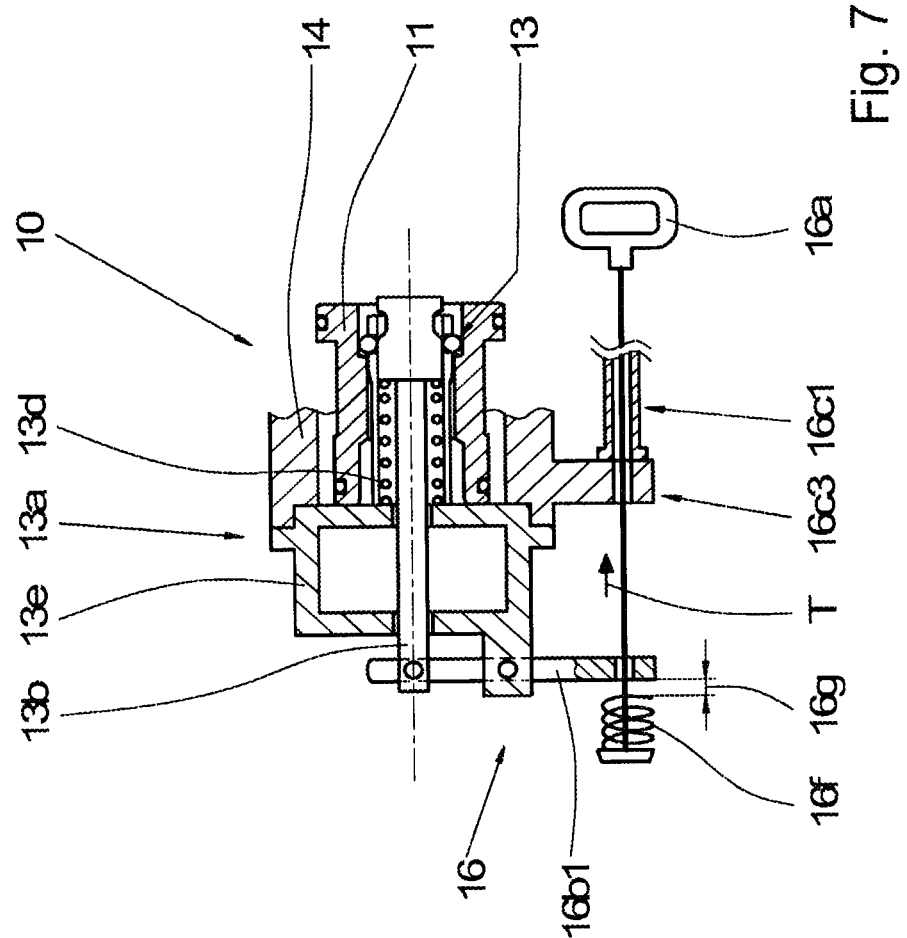
FIG. 7 shows a second variant of a component design of the parking lock according to FIG. 1.

The second exemplary variant for a deflecting device for axially displacing the armature rod 13$b$ of the electromagnet 13$a$ represented in FIG. 7 includes a rocker arm 16$b$1, which is pivotably mounted on the side of the electromagnet 13$a$ facing away from the piston 11 and the detent device 13 at the housing 13$e$ of the electromagnet 13$a$, and two opposite free ends, of which the first free end of this lever 16$b$1 is articulatedly connected to the armature rod 13$b$ of the electromagnet 13$a$. The second free end of the lever 16$b$1, however, includes a through hole for an inner cable of a Bowden cable 16$c$1 of the emergency engagement device 16, wherein a sheath of this Bowden cable 16$c$1 rests via a counter support 16$c$3 against the actuator housing 14 of the actuator 10, which itself is fixedly connected to the housing 13$e$ of the electromagnet 13$a$. If the inner cable of the Bowden cable 16$c$1 is manually pulled in the translation direction T with the aid of the actuating element 16$a$ of the emergency engagement device 16 of the parking lock, which is designed as a hand lever in this case, by way of example, the armature rod 13$b$ releases the detent device 13 from its detent position.

In order to decouple the Bowden cable 16$c$1 from the lever 16$b$1 and, therefore, from the armature rod 13$b$ during normal operation in a structurally simple way, the inner cable of the Bowden cable 16$c$1 is inserted into the through hole arranged at the second free end of the lever 16$b$1 with a predefined open space 16$g$, which is greater than the axial displacement of the electromagnet 13$a$ upon energization, so that an energization of the electromagnet 13$a$ during normal operation does not result in a movement of the inner cable of the Bowden cable. In addition, the Bowden cable 16$c$1 is provided with a compensation spring 16$f$, which operates as a travel and force limiter and is utilized for protecting the electromagnet 13$a$.

Figure 8:
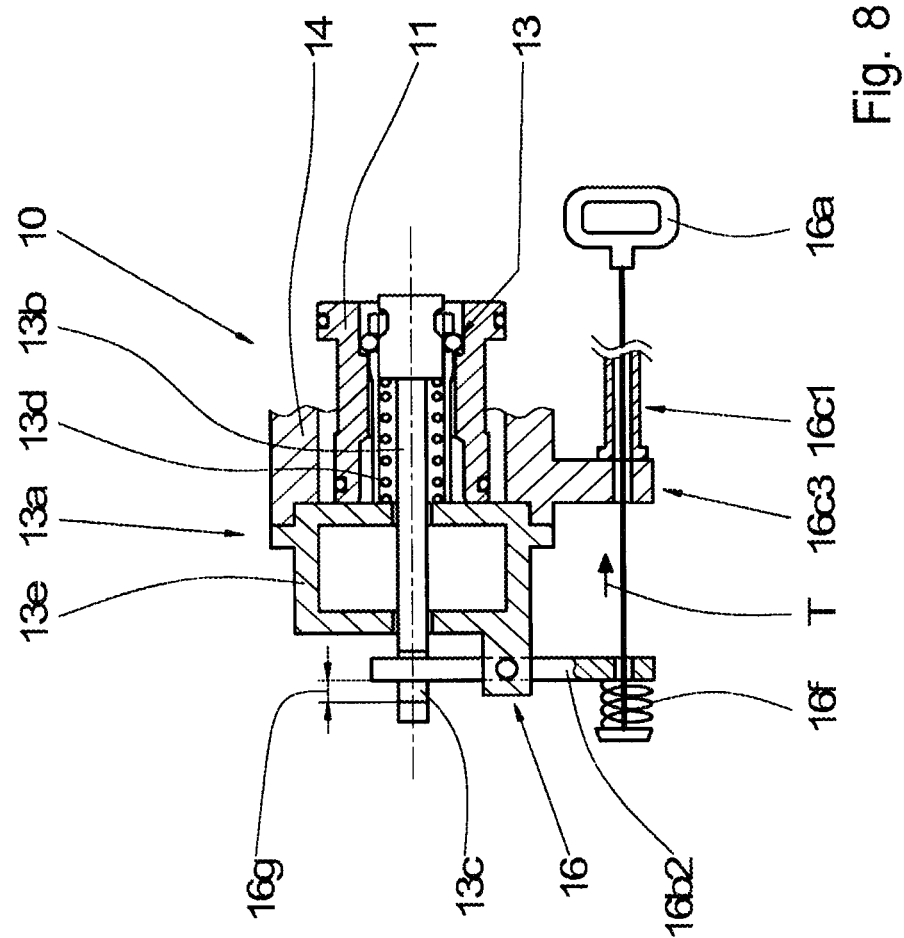
FIG. 8 shows a third variant of a component design of the parking lock according to FIG. 1.

The third exemplary variant for a deflecting device for axially displacing the armature rod 13$b$ of the electromagnet 13$a$ represented in FIG. 8 includes a rocker arm 16$b$2, which is pivotably mounted on the side of the electromagnet 13$a$ facing away from the piston 11 and the detent device 13 at the housing 13$e$ of the electromagnet 13$a$, and two opposite free ends, of which the first free end loosely engages into a driving section 13$c$ of the armature rod 13$b$ of the electromagnet 13$a$. Similarly to FIG. 6, in FIG. 7 as well, a through hole for an inner cable of a Bowden cable 16$c$1 of the emergency engagement device 16 is provided at the second free end of the lever 16$b$2, wherein a sheath of this Bowden cable 16$c$1, as in FIG. 6, rests via a counter support 16$c$3 against the actuator housing 14, which itself is fixedly connected to the housing 13$e$ of the electromagnet 13$a$. If the inner cable of the Bowden cable 16$c$1 is manually pulled in the translation direction T with the aid of the actuating element 16$a$ of the emergency engagement device 16 of the parking lock, which is designed as a hand lever in this case, by way of example, the armature rod 13$b$ releases the detent device 13 from the detent position.

In order to decouple the Bowden cable 16$c$1 from the lever 16$b$2 and, therefore, from the armature rod 13$b$ during normal operation in a structurally simple way, the length of the driving section 13$c$ of the armature rod 13$b$, as viewed in the longitudinal direction of the armature rod 13$b$, is greater than the axial displacement of the electromagnet 13$a$ upon energization, and so an energization of the coil of the electromagnet 13$a$ during normal operation does not result in a pivoting of the lever 16$b$2. The Bowden cable 16$c$1 is provided with a compensation spring 16$f$, by way of example, which operates as a travel and force limiter and is utilized for protecting the electromagnet 13$a$.

Figure 9:
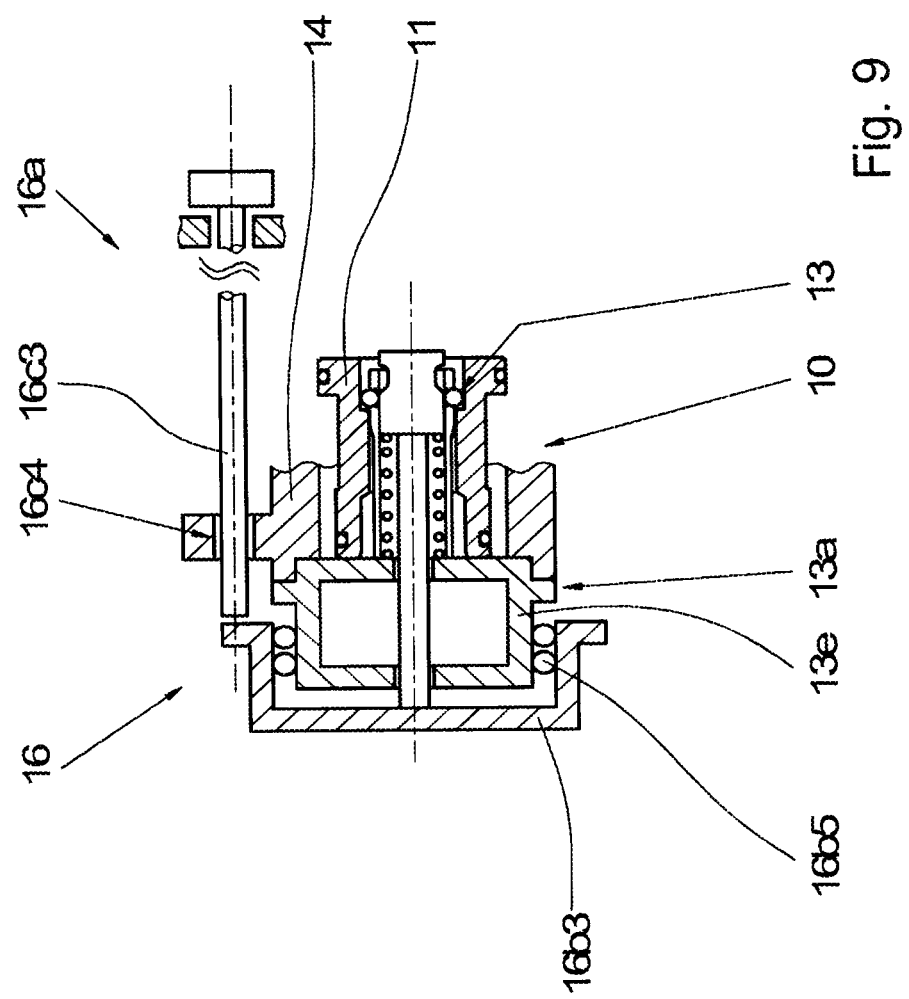
FIG. 9 shows a fourth variant of a component design of the parking lock according to FIG. 1.

The fourth exemplary variant for a deflecting device for axially displacing the armature rod 13$b$ of the electromagnet 13$a$ represented in FIG. 9 includes a sleeve 16$b$3, which is axially displaceably mounted via a mounting 16$b$5 on the housing 13$e$ of the electromagnet 13$a$ and at least partially concentrically surrounds the electromagnet 13$a$. The cup base of this sleeve 16$b$3 is fixedly connected to the armature rod 13$b$ of the electromagnet 13$a$. A collar provided at the shell surface of this sleeve 16$b$3 is utilized as a mating surface for a push rod 16$c$3 of the emergency engagement device 16. The push rod 16$c$3 itself extends axially parallel to the armature rod and, in this case, is axially displaceably mounted at the actuator housing 14 via a mounting 16$c$4, by way of example. If the emergency engagement device 16 is manually actuated by pressing the actuating element 16$a$ of the emergency engagement device 16 designed, in this case, as a pushbutton, by way of example, the push rod 16$c$3 is pressed against the collar or against the mating surface of the sleeve 16b3 and is axially displaced in the translation direction T so far that the armature rod 13b releases the detent device 13 from its detent position. During normal operation, however, the armature rod 13b of the electromagnet 13a, upon energization of the coil, transfers no axial loads onto the push rod 16c3.

Figure 10:
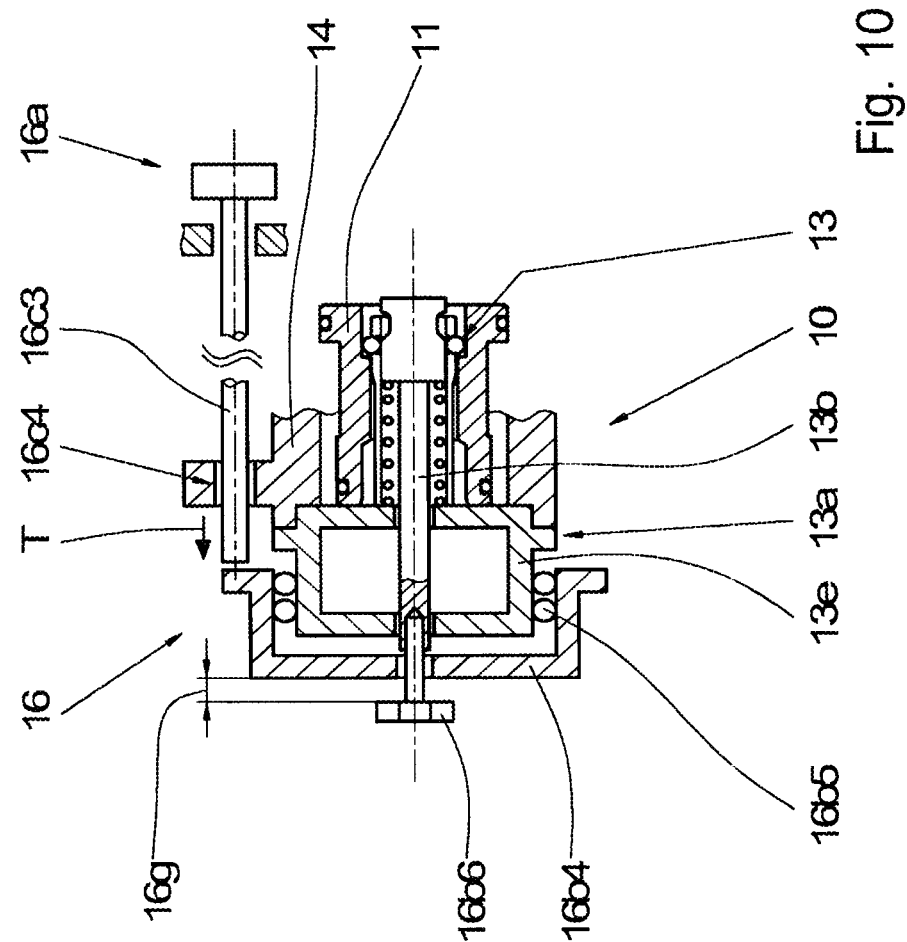
FIG. 10 shows a fifth variant of a component design of the parking lock according to FIG. 1.

The fifth exemplary variant for a deflecting device for axially displacing the armature rod 13b of the electromagnet 13a represented in FIG. 10 includes a sleeve 16b4, which is axially displaceably mounted via a mounting 16b5 on the housing 13e of the electromagnet 13a and at least partially concentrically surrounds the electromagnet 13a. It is provided that the armature rod 13b of the electromagnet 13a centrally axially displaceably extends through the cup base of the sleeve 16b4 and, on its side of the cup base of the sleeve 16b4 facing away from the electromagnet 13a, includes a driving device 16b6 cooperating with the cup base, via which the sleeve 16b4 can axially displace the armature rod 13b. In the exemplary embodiment represented here, this driving device 16b6 is designed as a setting bolt, which is screwed into the end of the armature rod 13b facing away from the detent device 13, wherein the bolt head forms a mating surface cooperating with the cup base of the sleeve 16b4 and which, in the mounted condition, is arranged on the side of the cup base facing away from the electromagnet 13a. In order to decouple the sleeve 16b4 from the armature rod 13b during normal operation, a predefined open space 16g is axially set between the cup base of the sleeve 16b4 and the mating surface of the setting bolt 16b6, which is greater than the axial displacement of the electromagnet 13a upon energization, so that an energization of the coil of the electromagnet 13a during normal operation does not result in an axial movement of the sleeve 16b4.

In order to displace the sleeve 16b4 in the axial direction of the armature rod, the emergency engagement device 16 includes a push rod 16c3 as an actuator, which extends axially parallel to the armature rod 13b and is axially displaceably mounted, via a mounting 16c4, at the actuator housing 14, by way of example. If the emergency engagement device 16 is manually actuated by pressing the actuating element 16a of the emergency engagement device 16 designed as a pushbutton, by way of example, the push rod 16c3 is pressed against a mating surface of the sleeve 16b4 and is axially displaced in the translation direction T, traversing the open space 16g, so far that the armature rod 13b releases the detent device 13 from the detent position. During normal operation, the armature rod 13b of the electromagnet 13a, upon energization of the coil, transfers no axial loads onto the sleeve 16b4 and the push rod 16c3.

Figure 11:
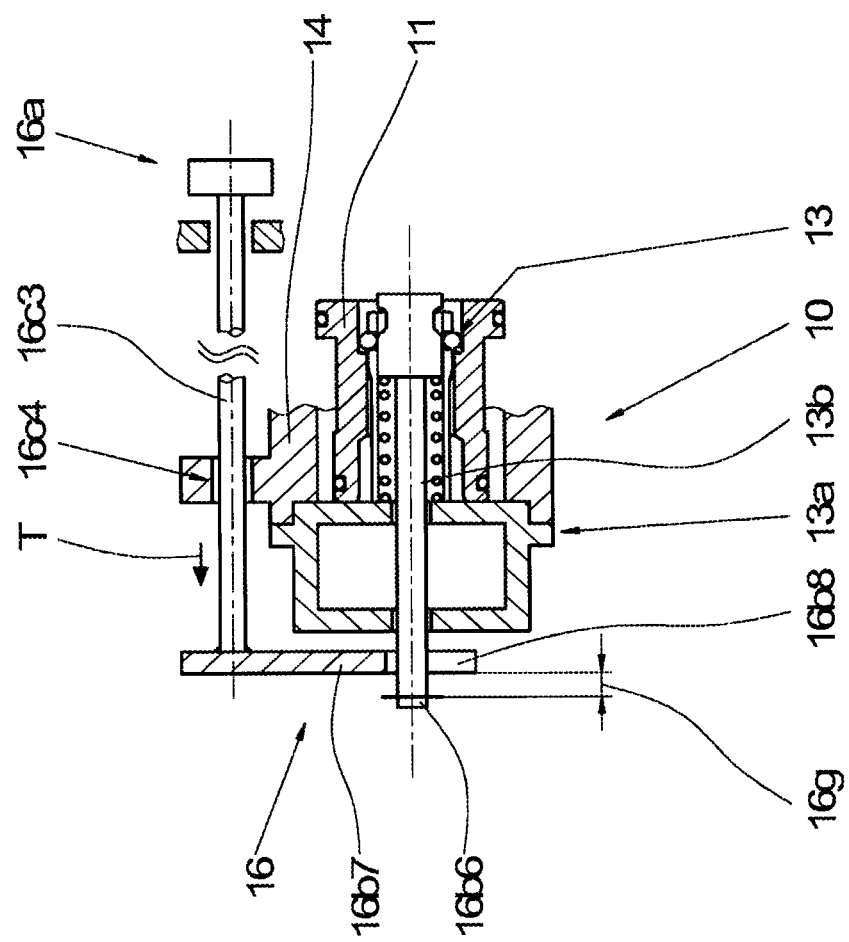
FIG. 11 shows a sixth variant of a component design of the parking lock according to FIG. 1.

The sixth exemplary variant for a deflecting device for axially displacing the armature rod 13b of the electromagnet 13a represented in FIG. 11 includes a selector fork 16b7, which is fixedly connected to a push rod 16c3, which itself extends axially parallel to the armature rod 13b and is axially displaceably mounted via a mounting 16c4 at the actuator housing 14, by way of example. A forked end 16b8 of the selector fork 16b7 forms the operative connection to the armature rod 13b of the electromagnet 13a acting upon the detent device 13. For this purpose, the armature rod 13b includes, on its side facing away from the detent device 13, a driving device 16b6, which is designed, by way of example, as a disk inserted into a groove of the armature rod 13b. The forked end 16b8 of the selector fork 16b7 surrounds the armature rod 13b close to this disk on the side of the disk that faces the electromagnet 13a and the detent device 13, so that the disk or the driving device 16b6 forms a stop for the forked end 16b8 of the selector fork 16b7 and the forked end 16b8 of the selector fork 16b7 acts, during a movement of the push rod 16c3 in the translation direction T, on the end face of the disk or the driving device 16b6 that faces the electromagnet 13a and the detent device 13. Geometrically, a predefined open space 16g is axially set between the selector fork 16b7 and the mating surface of the driving device 16b6, which is greater than the axial displacement of the electromagnet 13a upon energization, so that an energization of the coil of the electromagnet 13a during normal operation does not result in an axial movement of the selector fork 16b7. In this way, the selector fork 16b7 is decoupled from the armature rod 13b during normal operation of the automatic transmission.

If the emergency engagement device 16 is manually actuated by pressing the actuating element 16a of the emergency engagement device 16 designed as a pushbutton, by way of example, the push rod 16c3 is pressed in the translation direction T, traversing the open space 16g, so far that the armature rod 13b releases the detent device 13 from its detent position. During normal operation, the armature rod 13b of the electromagnet 13a, upon energization of its coil, transfers no axial loads onto the selector lever 16b7 and the push rod 16c3.

Figure 12:
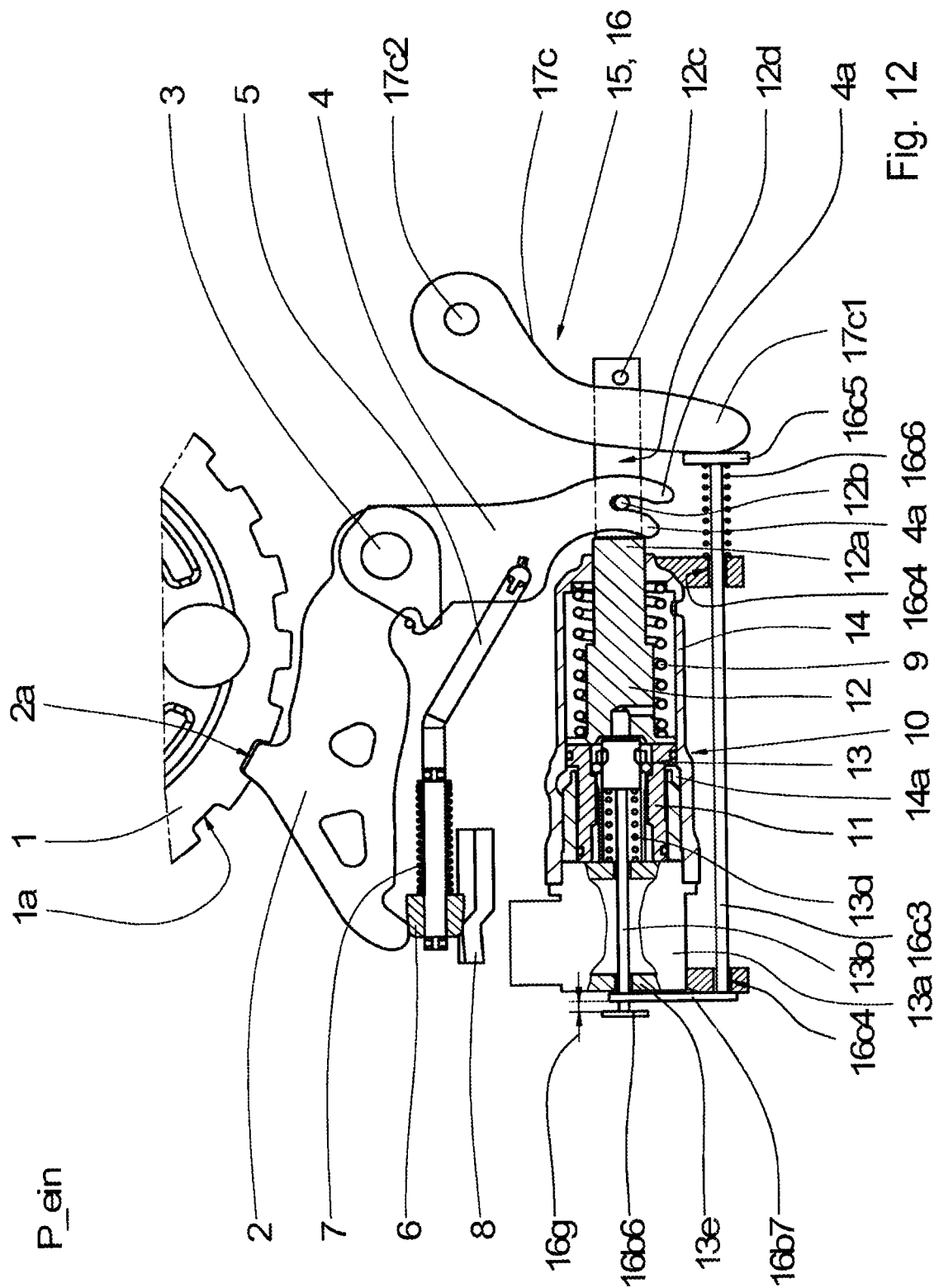
FIG. 12 shows a diagrammatic sectioning of a second exemplary embodiment of a parking lock according to the invention in the "parking lock engaged" engagement position.
Figure 13:
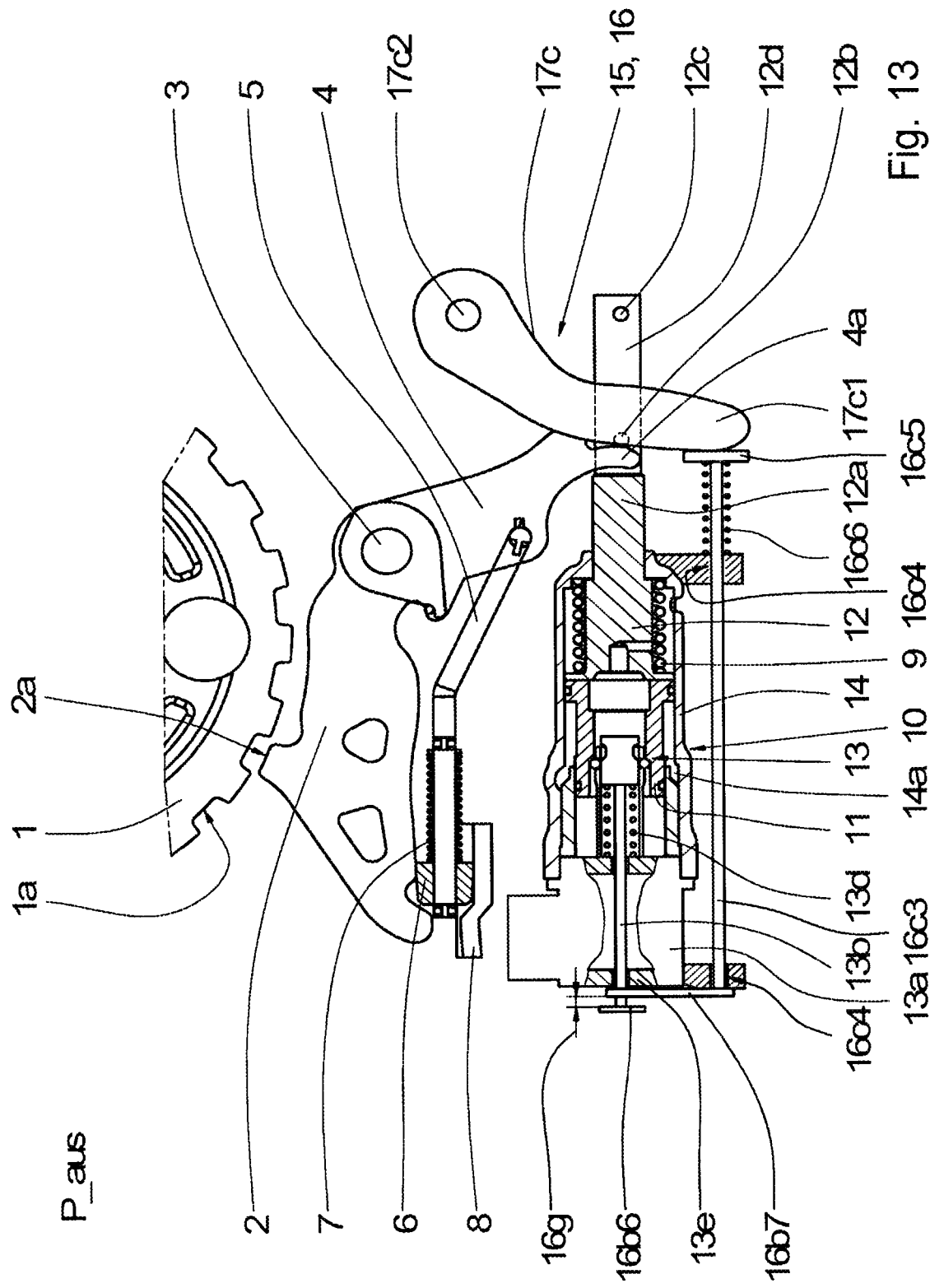
FIG. 13 shows a diagrammatic sectioning of the parking lock according to FIG. 12 in the "parking lock disengaged" engagement position.
Figure 14:
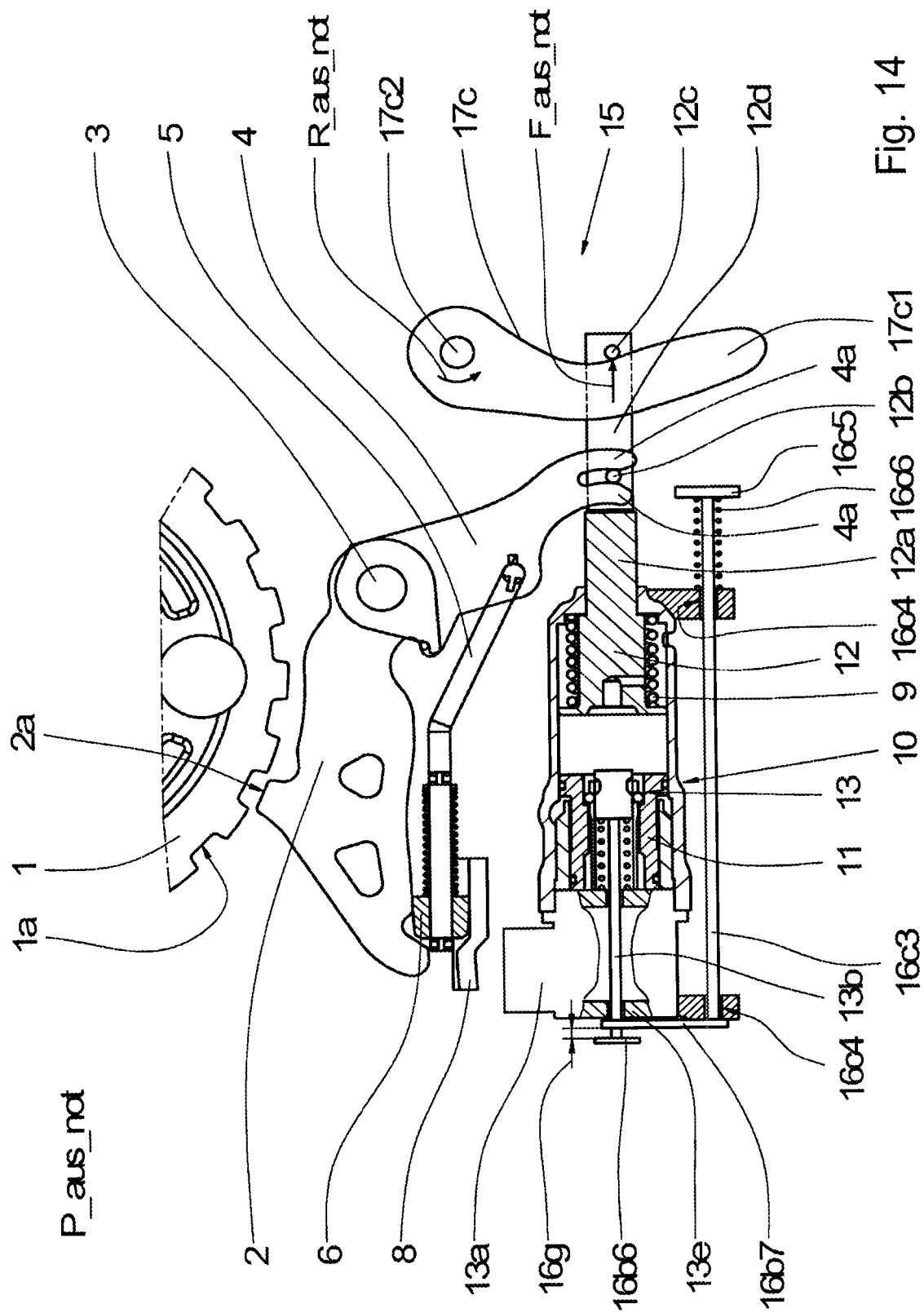
FIG. 14 shows a diagrammatic sectioning of the parking lock according to FIG. 12 in the "parking lock emergency-released" engagement position.

A second exemplary embodiment of a parking lock according to example aspects of the invention is described in greater detail in the following and with reference to FIGS. 12 through 16. The second exemplary embodiment of a parking lock according to example aspects of the invention is also based on the parking lock design from DE 10 2017 218 748 A1 and includes, according to the invention, an emergency engagement device 16 in addition to the emergency disengagement device 15. FIG. 12 shows a sectioning of this parking lock in the "parking lock engaged" engagement position, indicated by the reference character P_ein, whereas the diagrammatic sectioning from FIG. 13 shows this parking lock during normal operation of the automatic transmission in the "parking lock disengaged" engagement position, indicated by the reference character P_aus. FIG. 14 shows a diagrammatic sectioning of this parking lock during emergency operation of the automatic transmission upon actuation of the emergency engagement device 16, whereas the diagrammatic sectioning from FIG. 16 shows this parking lock during emergency operation of the automatic transmission in the "parking lock emergency-interlocked" engagement position, in which the locking pawl 2 interlocks the parking interlock gear 1 against rotation due to an actuation of the emergency engagement device 16, indicated by the reference character P_aus_not.

Figure 15:
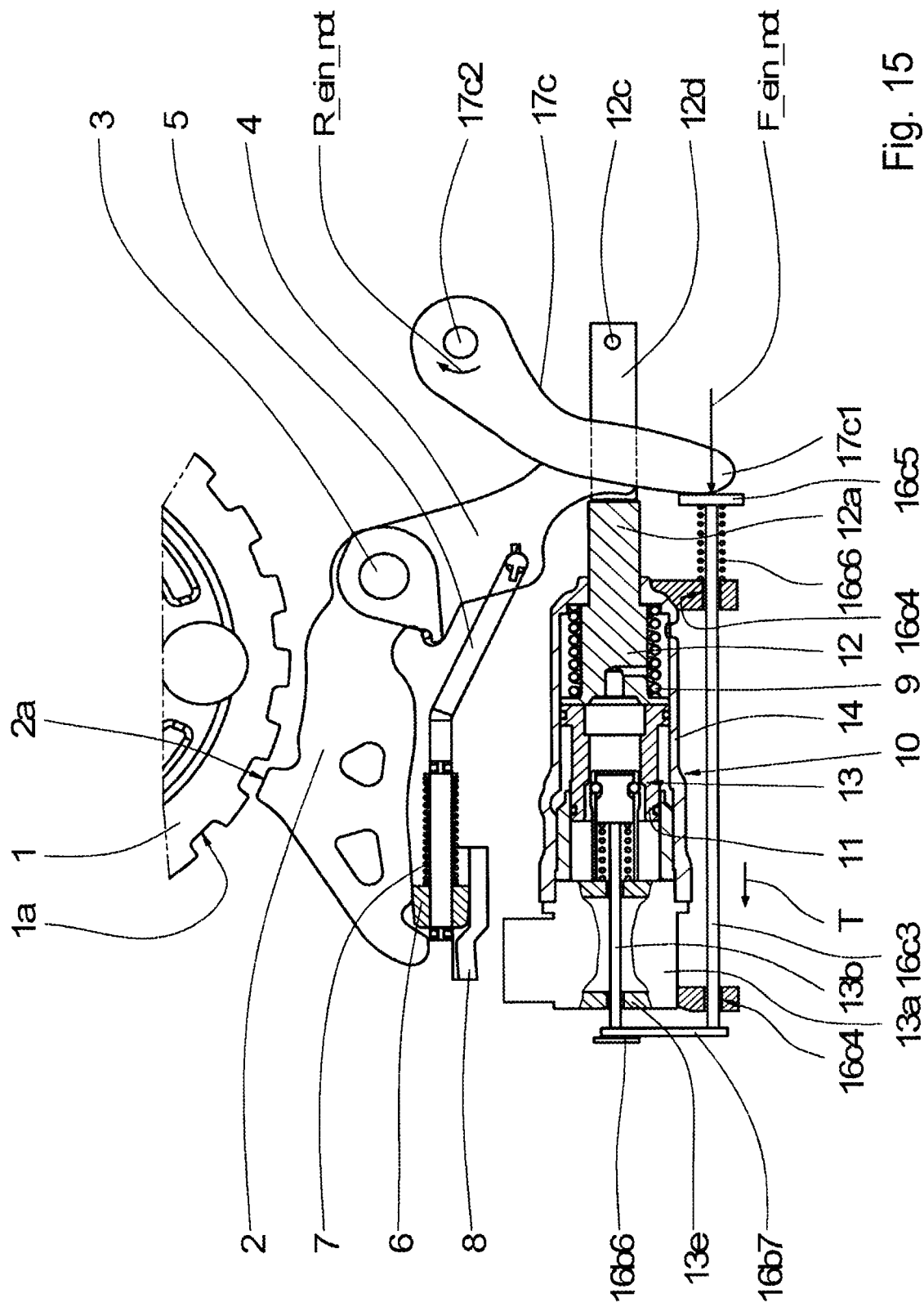
FIG. 15 shows a diagrammatic sectioning of the parking lock according to FIG. 12 upon actuation of the emergency engagement device.
Figure 16:
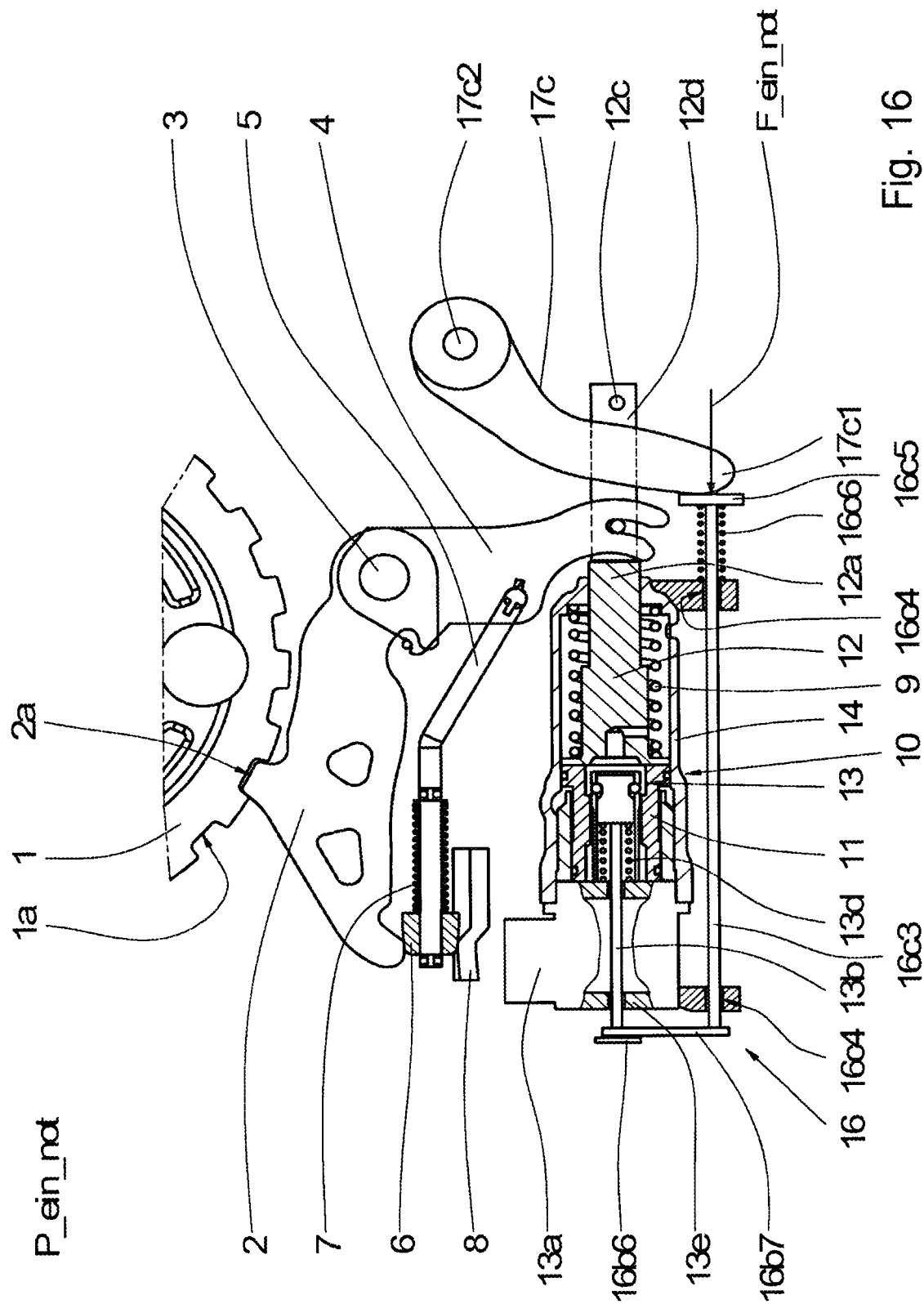
FIG. 16 shows a diagrammatic sectioning of the parking lock according to FIG. 12 in the "parking lock emergency-interlocked" engagement position.

Finally, FIG. 15 shows a sectioning of this parking lock in the "parking lock emergency-released" engagement position, in which the parking interlock gear 1 can freely rotate due to an actuation of the emergency disengagement device 15, indicated by the reference character P_ein_not.

In a comparison of FIGS. 12 through 16 with FIGS. 1 through 5, it is readily apparent that the parking lock according to the second exemplary embodiment differs from the parking lock according to the first exemplary embodiment essentially with respect to the structural design of the coupling of the armature rod 13b of the electromagnet 13a provided for actuating the detent device 13. In addition, in the second exemplary embodiment of a parking lock according to example aspects of the invention, a special coupling of the emergency disengagement device 15 and the emergency engagement device 16 is provided. Therefore, the following description of FIGS. 12 through 16 can be limited to these differences in order to avoid repetitions.

At first glance, it is apparent that, in the second exemplary embodiment of a parking lock according to example aspects of the invention, a mechanism derived from FIG. 11 is provided for manually actuating the armature rod 13*b*. Correspondingly, the mechanism includes a selector fork 16*b*7, which is loosely hung into a driving device 16*b*6 of the armature rod 13*b* while maintaining an open space 16*g*, which is slightly greater than the axial displacement of the electromagnet 13*a* upon energization. The mechanism also includes a push rod 16*c*3 for displacing the selector fork 16*b*7 in the axial direction of the armature rod 13*b*, which extends axially parallel to the armature rod 13*b*, is axially displaceably mounted via a bearing 16*c*4 at the housing of the electromagnet 13*a* and at the actuator housing 14, and is axially displaced in the translation direction T upon actuation of the emergency engagement device 16, with the result that the armature rod 13*b* releases the detent device 13 from the detent position fixing the first piston 11 of the actuator 10. For this purpose, the end of the push rod 16*c*3 facing the selector fork 16*b*7 is fixedly connected to the selector fork 16*b*7, whereas the end of the push rod 16*c*3 facing away from the selector fork 16*b*7 is designed in the manner of a tappet including a mating surface 16*c*5 for an inner lever 17*c*—arranged in the interior space of the transmission housing—of an emergency control device, with the aid of which the emergency disengagement device 15 and the emergency engagement device 16 are selectively actuatable preferably from within the interior space of the motor vehicle. The push rod 16*c*3 is preloaded with respect to the actuator housing 14 via a recoil spring 16*c*6.

The inner lever 17*c* of the emergency control device is connected in a torsion-proof manner via a shaft 17*c*2 extending through the transmission housing to an outer lever (not represented in greater detail here) arranged outside the transmission housing and is pivotably mounted at or in the transmission housing via this shaft 17*c*2.

In order to be able to selectively actuate the emergency disengagement device 15 and the emergency engagement device 16, a leg 17*c*1 of the inner lever 17*c* loosely engages into an engagement section 12*d* of the piston rod 12*a* of the second piston 12 of the actuator 10. As viewed in the axial direction, this engagement section 12*d* is delimited by a pin 12*c*, which is fixedly inserted into the piston rod 12*a* in the area of the end of the piston rod 12*a* facing away from the first piston 11 of the actuator 10. The side of the leg 17*c*1 that faces the pin 12*c* is utilized as a contact surface during the emergency disengagement of the parking lock, whereas the side of the leg 17*c*1 facing the mating surface 16*c*5 of the push rod 16*c*3 is utilized as a contact surface during the emergency engagement of the parking lock.

As is apparent in FIG. 14, in the case of a manual actuation of the emergency disengagement device 15 in the direction of rotation R_aus_not, the leg 17*c*1 of the inner lever 17*c* transmits a force F_aus_not, which results in the disengagement of the parking lock, via the pin 12*c* onto the piston rod 12*a* and, from the piston rod 12*a*, via the pin 12*b*, which is likewise fixedly inserted into the piston rod 12*a*, onto the selector lever 4, regardless of the position of the first piston 11 of the actuator 10. With respect to the amount, this force F_aus_not must be greater than the sum of the spring force of the spring 9 and the frictional forces in the actuating system of the locking pawl 2.

As is apparent in FIGS. 15 and 16, in the case of a manual actuation of the emergency engagement device 15 in the direction of rotation R_ein_not, the leg 17*c*1 of the inner lever 17*c* transmits a force F_ein_not, which results in the release of the detent device 13 from the interlocked position, onto the mating surface 16*c*5 of the push rod 16*c*3, from the push rod 16*c*3 via the selector fork 16*b*7 onto the armature rod 13*b* of the electromagnet 13*a* and, from the armature rod 13*b*, onto the detent device 13, regardless of the energization condition of the electromagnet 13*a*. With respect to the amount, the force F_ein_not must be greater than the sum of the spring forces of the push rod recoil spring 16*c*6 and the armature rod recoil spring 13*d*, the frictional forces of the mounting of the push rod 16*c*3 and the armature rod 13*b*, and a magnetic force that may still be acting upon the armature rod 13*b*.

At this point, it is expressly pointed out that neither the operating concept of the selective actuation of the emergency disengagement device 15 and the emergency engagement device 16 provided in the second exemplary embodiment of a parking lock according to example aspects of the invention nor the lever mechanism including the inner lever 17*c* provided within the scope of this concept are bound to the selector fork 16*b*7 for actuating the armature rod 13*b* of the electromagnet 13*a* provided, by way of example, in FIGS. 12 through 16. Rather, a person skilled in the art can also combine, as necessary, the deflecting devices provided in FIGS. 6 through 11 with the operating concept and lever mechanism provided in the second exemplary embodiment of a parking lock according to example aspects of the invention.

Figure 17:
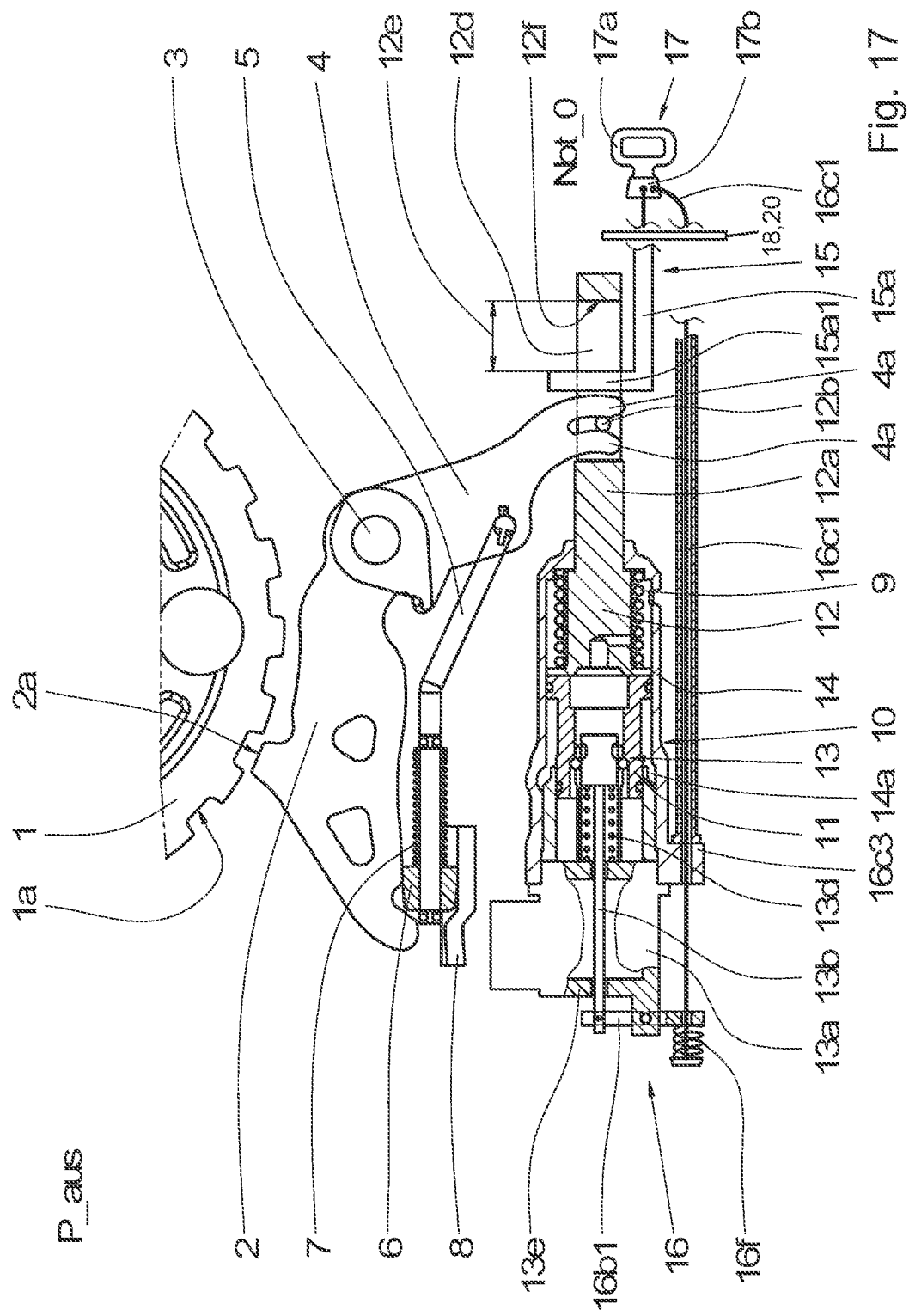
FIG. 17 shows a diagrammatic sectioning of a third exemplary embodiment of a parking lock according to the invention in the "parking lock disengaged" engagement position.

A third exemplary embodiment of a parking lock according to example aspects of the invention is described in greater detail in the following and with reference to FIGS. 17 through 19. An essential design feature of this third exemplary embodiment of a parking lock according to example aspects of the invention is the presence of a manually operable emergency control device 17 shared by the emergency disengagement device 15 and the emergency engagement device 16, which mechanically couples the emergency disengagement device 15 and the emergency engagement device 16 to one another in a predefined way. The diagrammatic sectioning from FIG. 17 shows the parking lock in the "parking lock disengaged" engagement position P_aus, in which the parking interlock gear 1 can freely rotate during normal operation of the automatic transmission. The diagrammatic sectioning from FIG. 18 shows the parking lock in the "parking lock emergency-interlocked" engagement position P_ein_not, in which the locking pawl 2 interlocks the parking interlock gear 1 against rotation due to an actuation of the emergency engagement device 16, whereas FIG. 19 shows the parking lock in the "parking lock emergency-released" engagement position P_aus_not, in which the parking interlock gear 1 can freely rotate again due to an actuation of the emergency disengagement device 15 following an actuation of the emergency engagement device 16.

Figure 18:
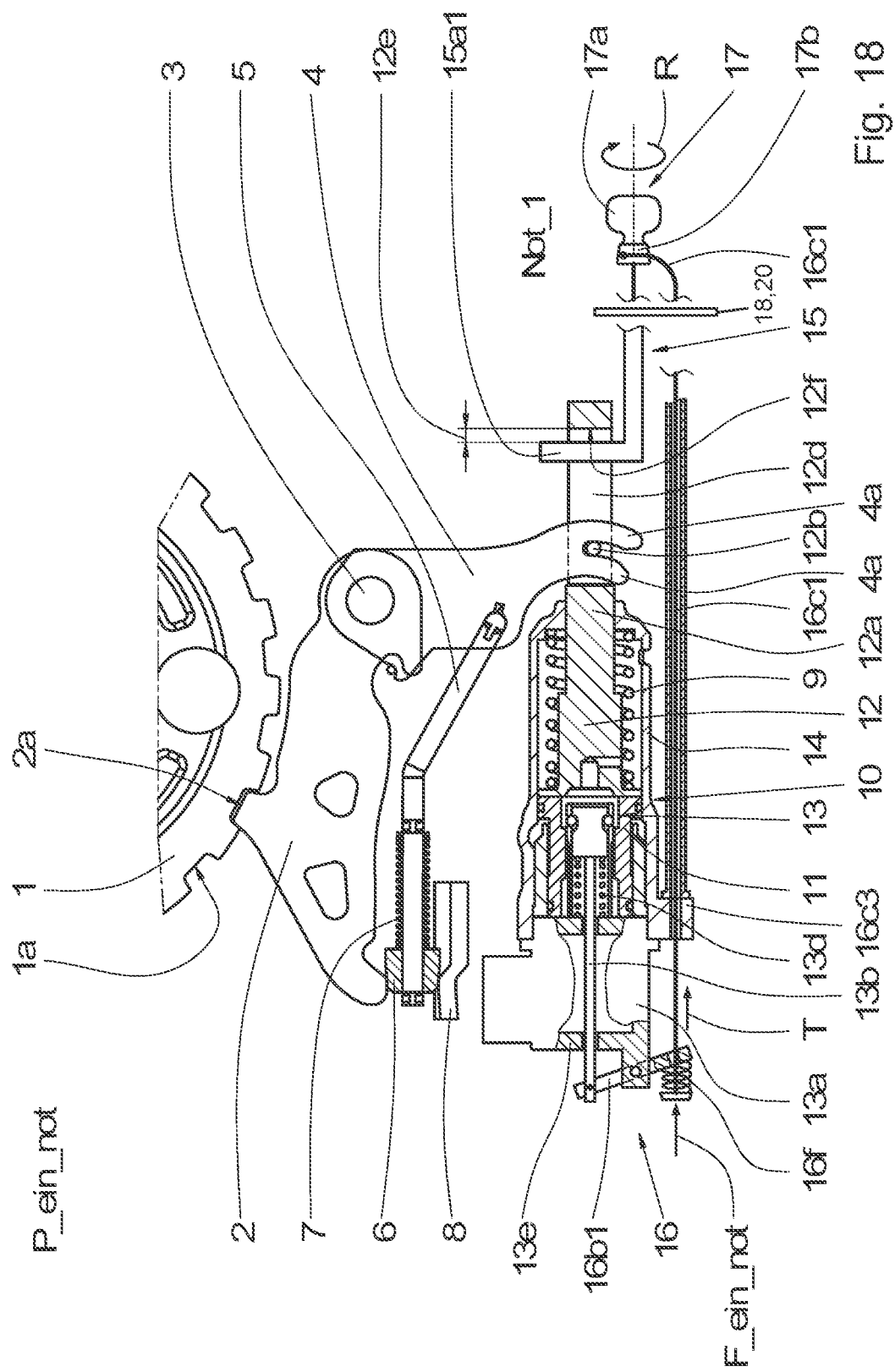
FIG. 18 shows a diagrammatic sectioning of the parking lock according to FIG. 17 in the "parking lock emergency-interlocked" engagement position.
Figure 19:
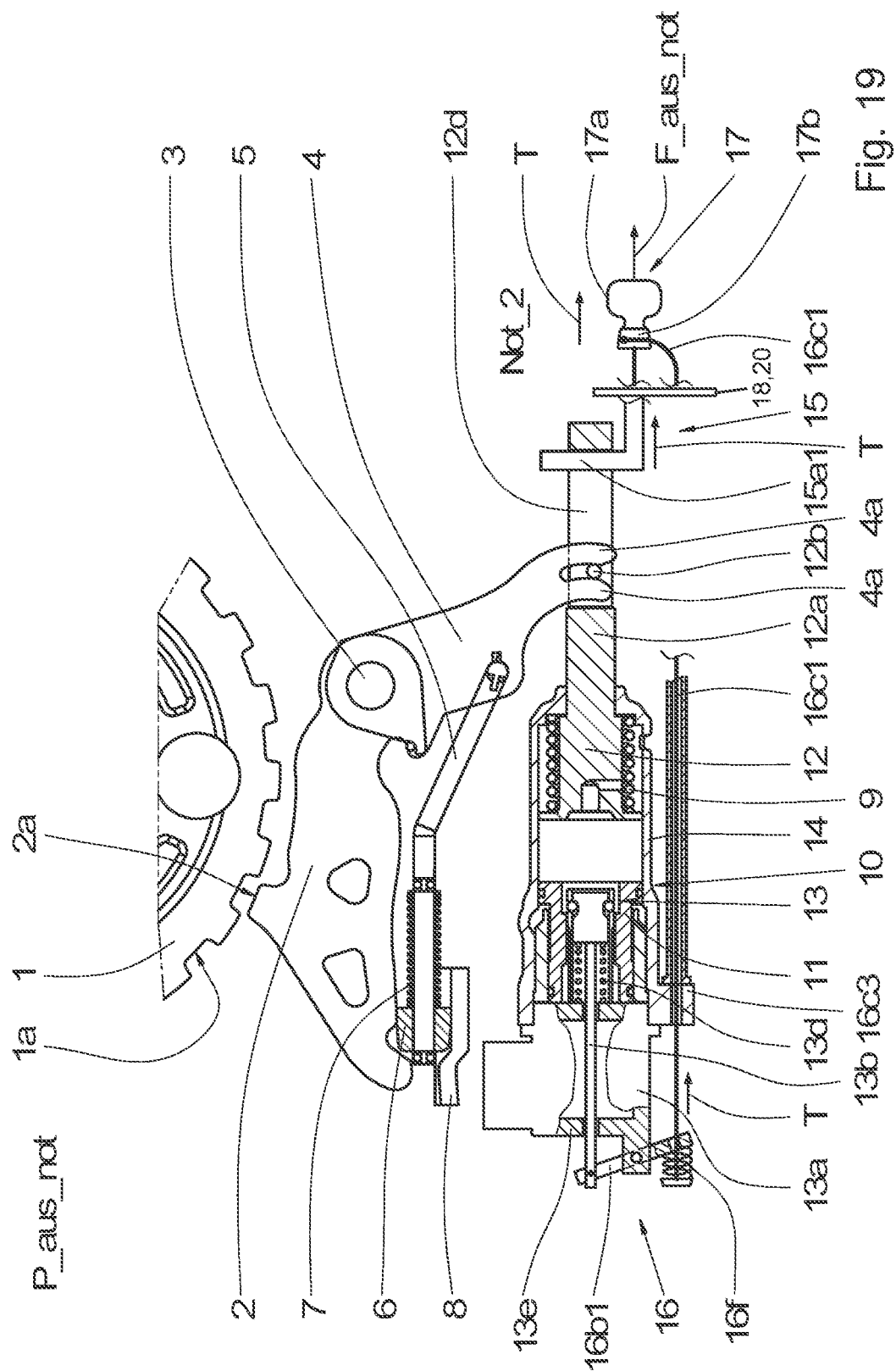
FIG. 19 shows a diagrammatic sectioning of the parking lock according to FIG. 17 in the "parking lock emergency-released" engagement position.

In a comparison of FIGS. 17 through 19 with FIGS. 12 through 16, it is readily apparent that the parking lock according to the third exemplary embodiment differs from the parking lock according to the second exemplary embodiment essentially with respect to the structural design of the coupling of the armature rod 13*b* of the electromagnet 13*a* provided for actuating the detent device 13 and with respect to the type of coupling of the emergency disengagement device 15 and the emergency engagement device 16. Therefore, the following description of FIGS. 17 through 19 can be limited to these differences in order to avoid repetitions.

At first glance, it is apparent that, in the third exemplary embodiment of a parking lock according to example aspects of the invention, a mechanism derived from FIG. 7 is provided for manually actuating the armature rod 13*b*.

Correspondingly, the mechanism includes a rocker arm 16b1, whose upper free end is articulatedly connected to the armature rod 13b of the electromagnet 13a, whose middle section is pivotably secured at the housing 13e of the electromagnet 13a, and in whose lower free end an inner cable of a Bowden cable 16c1 is hung. This inner cable of the Bowden cable 16c1 is acted upon by a pulling force F_ein_not upon actuation of the emergency engagement device 16, so that the armature rod 13b is axially displaced against the spring force of the armature rod recoil spring 13d and against the spring force of a compensation spring 16f and, in the process, releases the detent device 13 from the detent position fixing the first piston 11 of the actuator 10. In the process, an outer shell of the Bowden cable 16c1 rests against a counter support 16c3 provided at the actuator housing 14.

The emergency disengagement device 15 provided for the emergency disengagement of the parking lock includes an actuating element 15a designed as an angled pull rod, which axially displaceably engages, via the angled section 15a1, into an engagement section 12d of the piston rod 12a of the second actuator piston 12. The driving part 4a of the selector lever 4 provided for actuating the locking pawl 2 also engages into this engagement section 12d of the piston rod 12a, specifically at the pin 12b fixedly inserted into the piston rod 12a, via which an axial movement of the second piston 12 is transferred to the selector lever 4 and, vice versa, a swiveling motion of the selector lever 4 is transferred to the second piston 12. The length of the engagement section 12d as viewed in the axial direction of the piston rod 12a is dimensioned in such a way that a predefined open space 12e remains axially between the angled section 15a1 of the actuating element 15a and a mating surface 12f provided at the end of the piston rod 12a facing away from the first actuator piston 11 in the engagement condition P_aus during normal operation of the automatic transmission as well as in the engagement condition P_ein_not during emergency operation of the automatic transmission.

Due to this open space 12e, on the one hand, a regular movement of the second actuator piston 12 during normal operation, which results in the disengagement of the locking pawl 2 from a tooth space 1a of the parking interlock gear 1, is not transferred to the actuating element 15a of the emergency disengagement device 15, within the meaning of a decoupling of the actuator 10 and the emergency disengagement device 15 during normal operation. In addition, this open space 12e makes it possible that an emergency engagement of the parking lock via an actuation of the emergency engagement device 16 has no effect on the actuating element 15a of the emergency disengagement device 15.

The emergency disengagement device 15 and the emergency engagement device 16 according to the third exemplary embodiment of a parking lock according to example aspects of the invention can be manually actuated with the aid of a common emergency control device 17, which mechanically couples the emergency disengagement device 15 and the emergency engagement device 16 to each other in such a way that, starting from a basic control position associated with the normal operation of the automatic transmission, indicated by the reference character Not_0, a first emergency control position indicated by the reference character Not_1 can be manually selected, in which only the emergency engagement device 16 is actuated, and that, starting from this first emergency control position Not_1, a second emergency control position indicated by the reference character Not_2 can be manually selected, in which the emergency disengagement device 15 is also actuated, in addition to the emergency engagement device 16.

Due to this particular configuration, upon selection of the first emergency control position Not_1, a previously engaged parking lock remains in the engaged condition, whereas a previously disengaged parking lock is brought into the engaged condition, as desired, by way of the spring force of the spring 9 upon actuation of the emergency engagement device 16 after the movement release of the first actuator piston 11. Upon selection of the second emergency control position Not_2, the parking lock, which is now engaged in any case, is manually brought into the disengaged condition, as desired, against the spring force of the spring 9 with the aid of the manual actuation force F_aus.

In the exemplary design represented, the emergency control device 17 shared by the emergency disengagement device 15 and the emergency engagement device 16 is designed as a handle 17a including a combined turning and pulling mechanism. Upon switching from the basic control position Not_0 into the first emergency control position Not_1 and vice versa, the handle 17a carries out a rotary motion, which is marked by the reference character R, about its swivel joint 17b. Upon switching from the first emergency control position Not_1 into the second emergency control position Not_2 and vice versa, however, the handle 17a carries out a translatory motion marked by the reference character T.

As is apparent in FIG. 18, the turning motion of the handle 17a taking place for the purpose of the emergency engagement of the parking lock is at least essentially transferred only to the Bowden cable 16c1 of the emergency engagement device 16; the position of the actuating element 15a of the emergency disengagement device 15 engaging into the engagement section 12d of the piston rod 12a of the second actuator piston 12 remains at least essentially unchanged. The Bowden cable 16c1 transfers this turning motion of the handle 17a, as a pulling motion, onto the rocker arm 16b1, wherein the compensation spring 16f designed as a compression spring is compressed in a predefined way, without making use of the entire spring travel. The pulling force F_ein_not now acting upon the rocker arm 16b1 brings about a swiveling motion of the rocker arm 16b1. This swiveling motion of the rocker arm 16b1 results in an axial movement of the armature rod 13b of the electromagnet 13a. This axial movement of the armature rod 13b releases the detent device 13. If the parking lock was previously in the engagement position P_aus represented in FIG. 17, the second actuator piston 12, which is now preloaded by the spring force of the spring 9, axially displaces the first actuator piston 11, which is now no longer interlocked, into the piston position shown in FIG. 18, with the result that the selector lever 4, which is mechanically coupled to the second actuator piston 12, pulls the interlocking element 6 out of its interlocked position and, subsequently, swivels the locking pawl 2 out of the locking toothing of the parking interlock gear 1.

As is apparent in FIG. 19, the pulling motion of the handle 17a taking place for the purpose of the emergency disengagement of the parking lock is transferred to the actuating element 15a of the emergency disengagement device 15 engaging into the engagement section 12d of the piston rod 12a of the second actuator piston 12 as well as to the Bowden cable 16c1 of the emergency engagement device 16. While the actuating element 15a now moves the piston rod 12a of the second actuator piston 12 and, therefore, also the selector lever 4 against the spring force of the spring 9 into the position corresponding to the engagement condition P_aus, the inner cable of the Bowden cable 16c1 further compresses the compensation spring 16f, without a further axial movement of the armature rod 13b of the electromagnet 13a taking place as a result. Therefore, the compensation spring 16f operates as a force limiter in the Bowden cable 16c.

At this point, it is expressly pointed out that the operating concept including the emergency control device 17 shared by the emergency disengagement device 15 and the emergency engagement device 16 provided in the third exemplary embodiment of a parking lock according to example aspects of the invention is not bound to the rocker arm 16b1, which is provided in FIGS. 17 through 19, by way of example, for actuating the armature rod 13b of the electromagnet 13a. Rather, a person skilled in the art can also combine, as necessary, the deflecting devices provided in FIG. 6 and in FIGS. 8 through 12 with the operating concept and lever mechanism provided in the third exemplary embodiment of a parking lock according to example aspects of the invention.

In order to provide the operator of the emergency control device 17—which is preferably arranged in the interior space of the motor vehicle—with easily identified feedback regarding an impending changeover of the engagement conditions of the emergency control device 17, it is useful to equip the manually operable handle 17a provided in this case with haptic interlocks; a first haptic interlock, which must be overcome in order to exit the basic control position Not_0 of the emergency control device 17 associated with the normal operation of the automatic transmission, as well as a second haptic interlock, which must be overcome during emergency operation of the automatic transmission upon the changeover from the first emergency control position Not_1 into the second emergency control position Not_2. At this point, it is also pointed out that the change in the direction of motion, which is necessary in this case, upon the changeover of the individual engagement conditions of the handle 17a provided here already provides the operator with clear feedback regarding an impending changeover of the engagement conditions of the handle 17a.

In this case, it is useful to equip the common emergency control device 17—in this case, the handle 17a provided—with a detent, so that at least the two emergency control positions Not_1, Not_2 can be locked.

The operating concept provided in the third exemplary embodiment of a parking lock according to example aspects of the invention is based on the safety consideration that it is useful, during every manual intervention in the engagement condition of the parking lock of the automatic transmission, to initially generate a safe condition, which reliably secures the motor vehicle against rolling away. In the knowledge of this safe basic condition, the operator can also intentionally manually release the parking lock, as necessary.

In all exemplary designs and embodiments explained above with reference to FIGS. 1 through 19, it was provided that the additional emergency engagement device 16 according to example aspects of the invention can be actuated, via the armature rod 13b of the electromagnet 13a acting upon the detent device 13, from the side that faces away from the detent device 13.

In one alternative, it is provided that the emergency engagement device 16 acts upon the side of the armature rod 13b facing the second piston 12 of the actuator 10 during the emergency engagement of the parking lock. For this purpose, the emergency engagement device 16 preferably includes an actuating rod 16d for actuating the armature rod 13b, which centrally extends through the piston rod 12a of the second piston 12, at least partially or in sections, and, in this case, is preferably axially displaceably mounted in the second piston 12 or in the piston rod 12a of the second piston 12.

Figure 20:
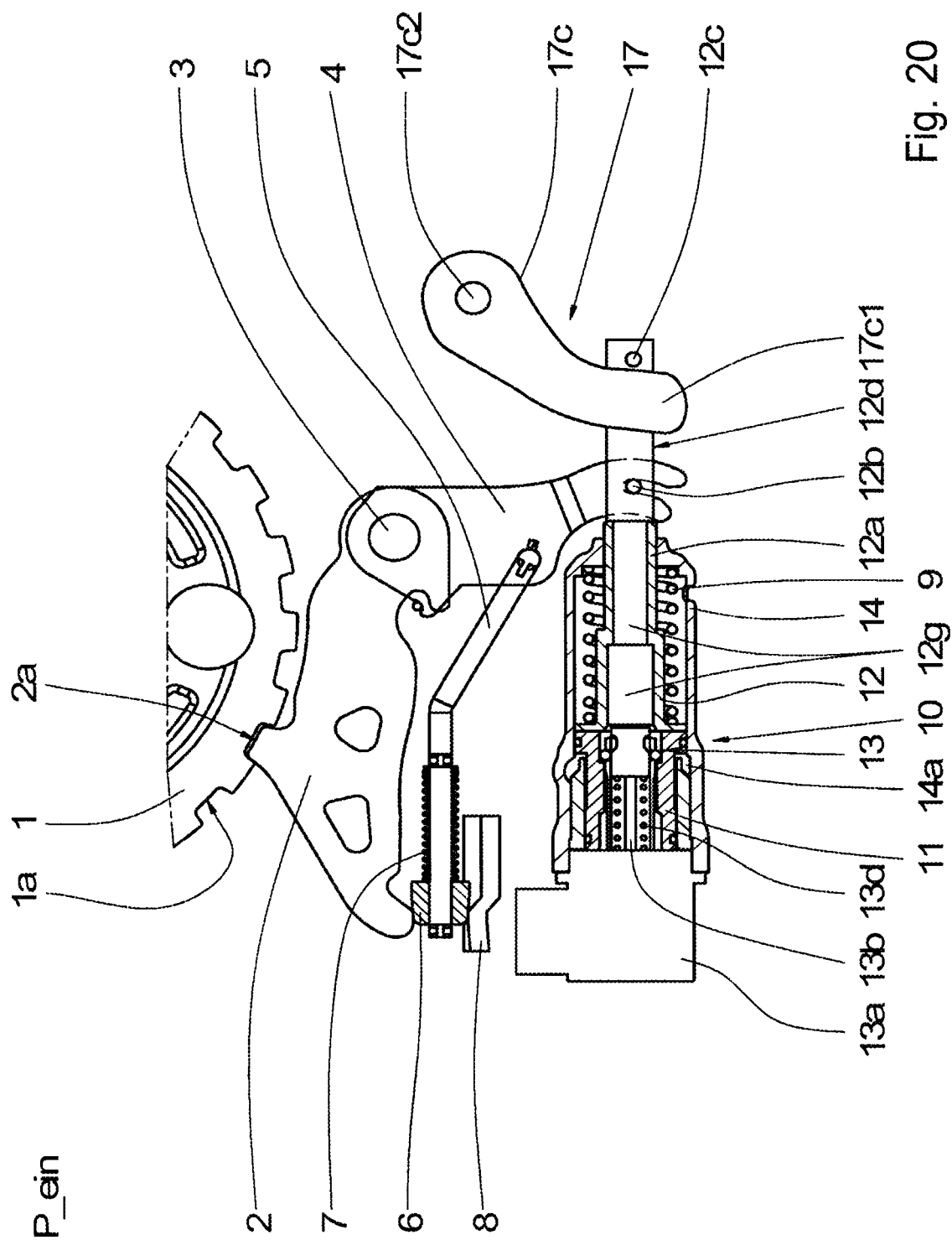
FIG. 20 shows a diagrammatic sectioning of a fourth exemplary embodiment of a parking lock according to the invention in the "parking lock engaged" engagement position.
Figure 21:
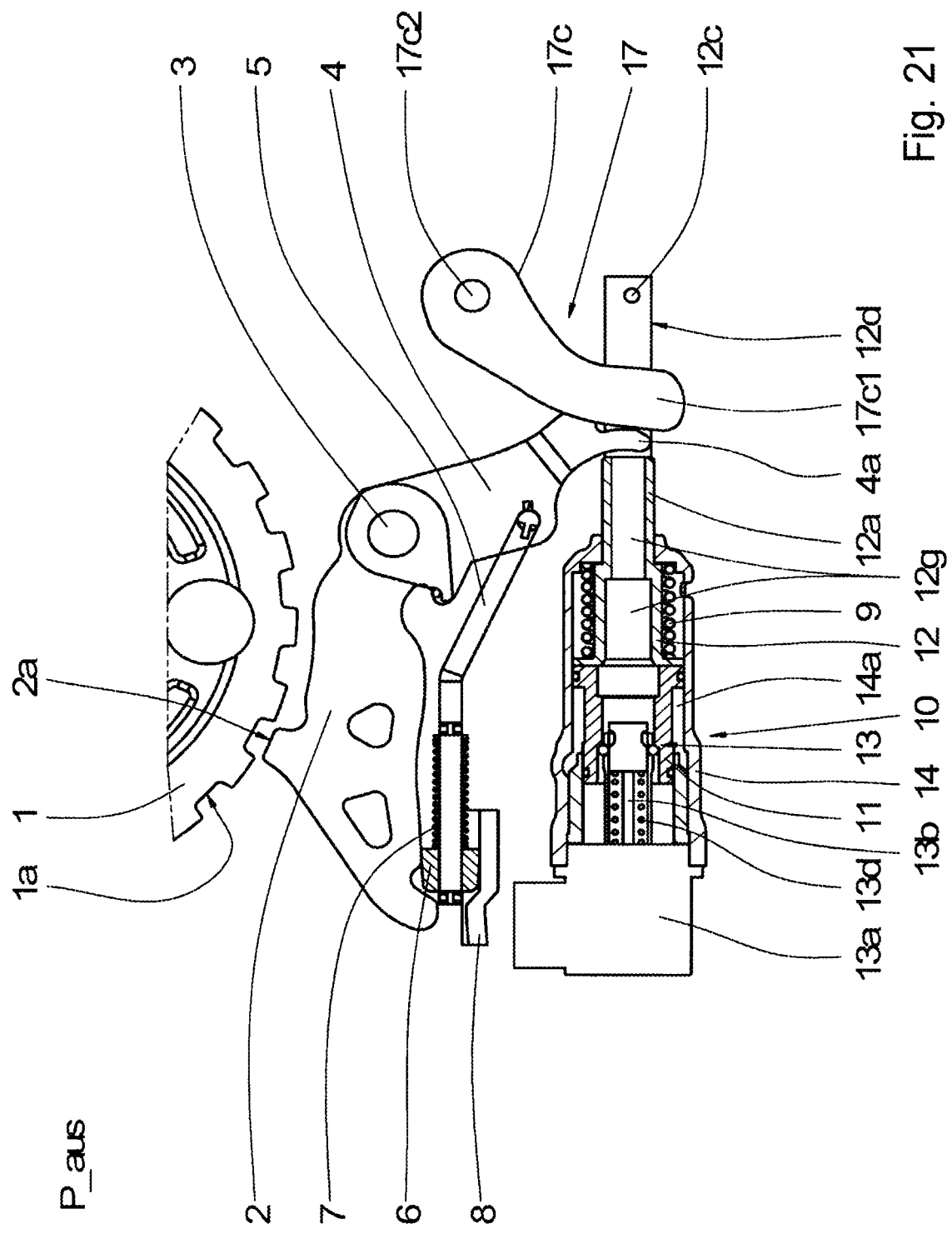
FIG. 21 shows a diagrammatic sectioning of the parking lock according to FIG. 20 in the "parking lock disengaged" engagement position.

For this purpose, a fourth exemplary embodiment of a parking lock according to example aspects of the invention is described in greater detail, in a schematic, in the following and with reference to FIGS. 20 through 23. FIG. 20 shows the parking lock during normal operation of the automatic transmission in the "parking lock engaged" engagement position P_ein, whereas FIG. 21 shows the parking lock during normal operation in the "parking lock disengaged" engagement position P_aus. FIG. 23 shows the parking lock during emergency operation of the automatic transmission in the "parking lock emergency-interlocked" engagement position P_ein_not, in which the locking pawl 2 interlocks the parking interlock gear 1 against rotation due to an actuation of the emergency engagement device 15, whereas FIG. 22 shows the parking lock during emergency operation in the "parking lock emergency-released" engagement position P_aus_not, in which the parking interlock gear 1 can freely rotate due to an actuation of the emergency disengagement device 16.

In a comparison of FIGS. 20 through 23 with FIGS. 12 through 16, it is readily apparent that the fourth exemplary embodiment of a parking lock according to example aspects of the invention shown in FIGS. 20 through 23 differs from the second exemplary embodiment of a parking lock according to the invention shown in FIGS. 12 through 16 essentially only with respect to the side of the electromagnet 13a from which the armature rod 13b of the electromagnet 13a acting upon the detent device 13 can be manually actuated with the aid of the emergency engagement device 16. The operating concept including a single manually operable emergency control device 17, with the aid of which either the emergency disengagement device 15 or the emergency engagement device 16 of the parking lock can be actuated, is identical in the second and fourth exemplary embodiments of a parking lock according to example aspects of the invention. Therefore, the following description of FIGS. 20 through 23 can be limited to this difference in order to avoid repetitions.

In FIGS. 20 and 21, it is apparent that, in contrast to the designs shown above, the second piston 12 of the actuator 10 provided for hydraulically actuating the parking lock is designed as a hollow body, wherein the corresponding cavity is marked by the reference character 12g. In FIGS. 22 and 23, it is apparent that this cavity 12g accommodates the additional—with respect to the prior art—emergency engagement device 16. The emergency engagement device 16 includes an actuating rod 16d, which centrally axially displaceably extends through the cavity 12g of the piston 12 and the piston rod 12a as viewed in the longitudinal direction of the piston 12, with one end adjacent to the detent device 13, with the other end adjacent to the leg 17c1 of the inner lever 17c of the emergency control device 17 provided for selectively actuating the emergency disengagement device 15 and the emergency engagement device 16. In order to be able to guide the actuating rod 16d in the piston rod 12a of the second actuator piston 12 in a precise and low-friction manner during its axial movement, a bearing section 16e is provided, in place of which separate antifriction or plain bearings can also be provided, in another structural design. In the exemplary embodiment represented, the actuating rod 16d is axially preloaded via a spring 16f with respect to the second piston 12, in order to ensure a precise return of the actuating rod 16d into a starting position of the actuating rod 16d associated with the non-actuated condition. The spring 16f rests axially against a bush 12h, which is fixedly inserted into the second piston 12 on the side of the second piston 12 facing the first actuator piston 11 and through which the actuating rod 16d centrally extends in the axial direction. In a simplified embodiment of the actuating rod 16d, this spring 16f can also be omitted.

Figure 22:
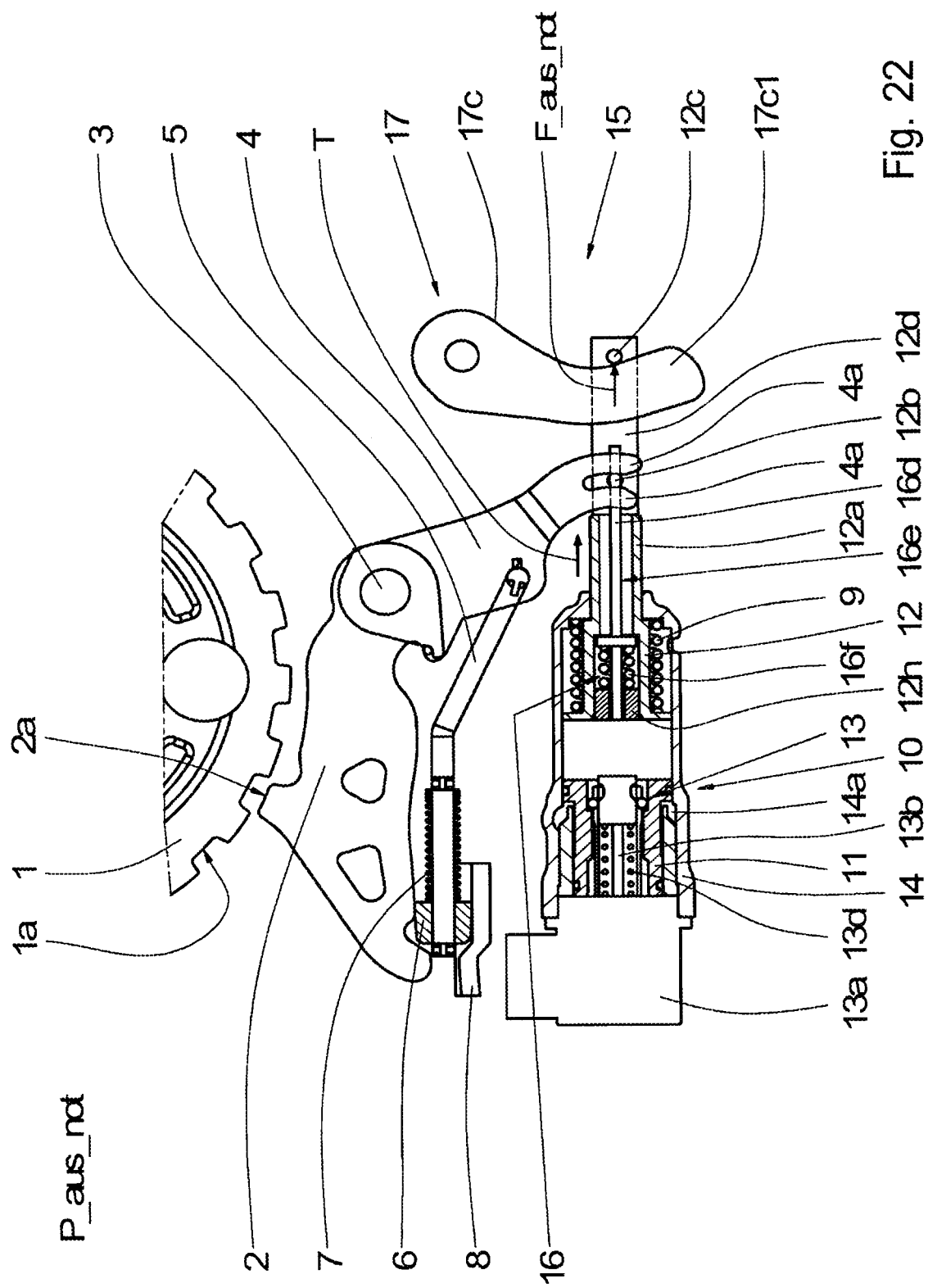
FIG. 22 shows a diagrammatic sectioning of the parking lock according to FIG. 20 in the "parking lock emergency-released" engagement position.
Figure 23:
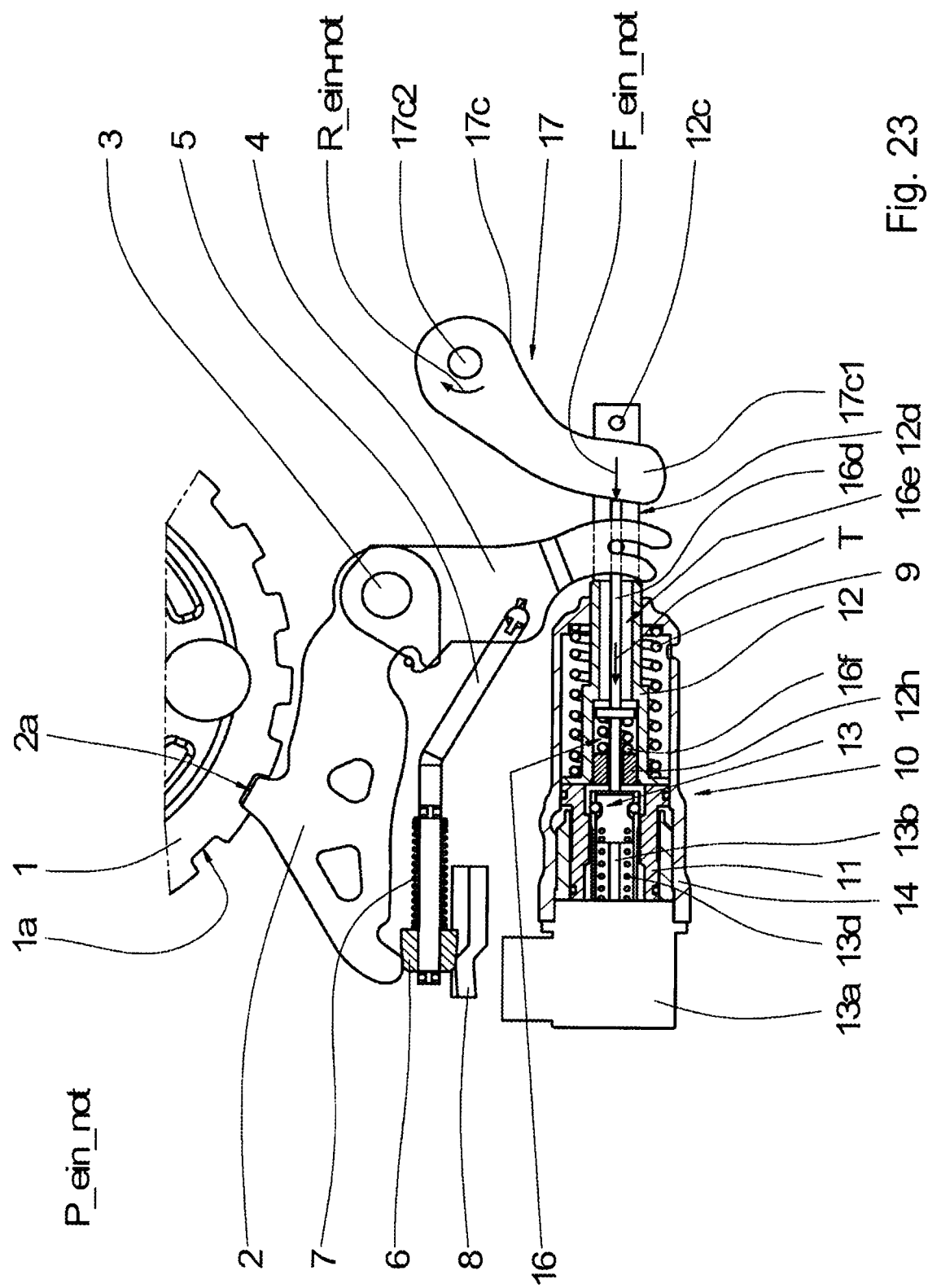
FIG. 23 shows a diagrammatic sectioning of the parking lock according to FIG. 20 in the "parking lock emergency-interlocked" engagement position.

In the exemplary embodiment represented in FIGS. 22 and 23, the actuating rod 16d of the emergency engagement device 16 is designed as a separate component. In an alternative design, it can also be provided that the actuating rod 16d is fixedly connected to the armature rod 13b of the electromagnet 13a or is designed as an integral part of the armature rod 13b of the electromagnet 13a. In this case, the actuating rod 16d also carries out an axial movement during normal operation of the actuator 10 upon actuation of the detent device 13 by the electromagnet 13a, so that an open space comparable to the open space 16g represented in FIGS. 7 and 10 through 14 is to be provided between the leg 17c1 of the inner lever 17c and the end of the actuating rod 16d facing this leg 17c1.

As is apparent in FIGS. 20 through 23, the piston rod 12a of the second piston 12 of the actuator 10, which is axially displaceable by the first piston 11, is articulatedly connected to the selector lever 4, in order to be able to disengage the parking lock with the aid of a pressurization of the pressure chamber 14a of the actuator 10 acting upon the first piston 11 of the actuator 10. The selector lever 4 converts the translatory motion of the second piston 12, via a swiveling motion, into a translatory motion of the interlocking element 6 acting upon the locking pawl 2 of the parking lock. In the exemplary embodiment represented here, the piston rod 12a of the second piston 12 includes a flattened engagement section 12d, into which two pins 12b, 12c are fixedly inserted, in parallel and axially spaced apart from one another, at a right angle to the central axis of the piston rods 12a, wherein this flattening is designed in such a way and these two pins 12b, 12c have been inserted into the piston rod 12a only so far that a sufficient open space for the actuating rod 16d is ensured in the center of the piston rod 12a. The pin 12b facing the first piston 11 is utilized for transmitting force between the piston rod 12a and the selector lever 4 and vice versa, whereas the pin 12c facing away from the first piston 11 is utilized for transmitting force between the emergency disengagement device 16 and the piston rod 12a. In the exemplary embodiment represented here, the selector lever 4 includes two driving parts 4a, which are bent at a right angle plane-parallel to the piston rod 12a, i.e., rearward in the image plane. The section of the pin 12b protruding laterally from the piston rod 12a loosely engages into the gap of the driving parts 4a. The inner lever 17c of the emergency control device 17, which can pivot about the central axis of the shaft 17c2 extending through the transmission housing wall, engages via its leg 17c1, on the side of the pin 12c facing the first piston 11, into the flattened engagement section 12d of the piston rod 12a and covers, via its width, an area that approximately corresponds to the outer diameter of the actuating rod 16d in the bearing section 16e (or approximately to the inner diameter of the bearing section 16e).

In an alternative component design, the piston rod 12a of the second actuator piston 12 can also be designed to be hollow across the entire length, so that the actuating rod 16d of the emergency engagement device 16 extends axially completely through the piston rod 12a. In this case, the device for driving the piston rod 12a upon actuation of the emergency release device 16 is to be structurally adapted by way of the emergency control device 17. In this case, in order to avoid the transmission of transversal loads onto the piston rod 12a, it can be provided that the selector lever 4 for driving the piston rod 12 includes a U-shaped driving section having two legs aligned plane-parallel to one another, which laterally surround the piston rod 12a, so that the piston rod 12a as viewed in its axial direction extends between these two plane-parallel legs of the selector lever 4 and the driving takes place on both sides of the piston rod 12 via a driving pin in each case.

As is apparent in FIG. 22, the inner lever 17c of the emergency control device 17 is pivoted in the direction of rotation R_aus_not for the purpose of the parking lock emergency disengagement via the emergency disengagement device 15. As a result, the leg 17c1 of the inner lever 17c transmits a force F_aus_not, which results in the disengagement of the parking lock, via the pin 12c, which is inserted into the piston rod 12a at the end of the piston rod 12a of the second piston 12 of the actuator 10 facing away from the first piston 11 of the actuator 10, onto the piston rod 12a and, from the piston rod 12a, via the pin 12b, which is likewise fixedly inserted into the piston rod 12a, onto the selector lever 4, regardless of the position of the first piston 11 of the actuator 10. With respect to the amount, the force F_aus_not must be greater than the sum of the spring force of the spring 9 and the frictional forces in the actuating system of the locking pawl 2.

As is apparent in FIG. 23, the inner lever 17c of the emergency control device 17 is pivoted in the direction of rotation R_ein_not for the purpose of the parking lock emergency engagement via the emergency engagement device 16. As a result, the leg 17c1 of the inner lever 17c transmits a compressive force F_ein_not, which results in the release of the detent device 13, via the actuating rod 16d onto the end of the armature rod 13b of the electromagnet 13a provided with the detent device 13, so that the detent device 13 is pressed out of its interlocked position regardless of the energization condition of the electromagnet 13a. With respect to the amount, the force F_ein_not must be greater than the sum of the spring forces of the actuating rod spring 16f and the armature rod recoil spring 13d, the frictional forces of the mounting of the actuating rod 16d and the armature rod 13b, and a magnetic force that may still be acting upon the armature rod 13b.

At this point, it is expressly pointed out that the embodiment of the emergency disengagement device 15 and the emergency engagement device 16 provided in the fourth exemplary embodiment of a parking lock according to example aspects of the invention is not bound to the combination with the actuating concept, provided in FIGS. 20 through 23 by way of example, including a single manually operable emergency control device 17, with the aid of which either the emergency disengagement device 15 or the emergency engagement device 16 of the parking lock can be actuated. Rather, a person skilled in the art can also combine, as necessary, the actuating concept, shown in FIGS. 20 through 23, of the emergency engagement device 16 including the actuating rod 16d, which centrally extends, at least in sections, through the piston rod 12a of the second piston 12 of the actuator 10, which is articulatedly connected to the selector lever 4 acting upon the locking pawl 2 of the parking lock, in order to be able to axially displace the armature rod 13b of the electromagnet 13a acting upon the detent device 13 in the case of an actuation of the emergency engagement device 16 from the side facing the second piston 12 of the actuator 10, with another operating concept.

For example, the actuating concept of the emergency engagement device 16 according to the fourth exemplary embodiment of a parking lock according to example aspects of the invention can be very easily combined with an operating concept, in which—similarly to the first exemplary embodiment of a parking lock according to example aspects of the invention—the emergency disengagement device 15 and the emergency engagement device 16 can be operated independently of one another.

The actuating concept of the emergency engagement device 16 according to the fourth exemplary embodiment of a parking lock according to example aspects of the invention is also comparatively easily combined with an operating concept, in which—similarly to the third exemplary embodiment of a parking lock according to example aspects of the invention—a common emergency control device mechanically couples the emergency disengagement device 15 and the emergency engagement device 16 to each other in such a way that, starting from a basic control position (Not_0) associated with the normal operation of the automatic transmission, a first emergency control position (Not_1) can be manually selected, in which only the emergency engagement device 16 is actuated and, starting from this first emergency control position (Not_1), a second emergency control position (Not_2) can be manually selected, in which the emergency disengagement device 15 is actuated, in addition to the emergency engagement device 16. In this case, a rocker arm for reversing the actuating direction would need to be provided in the power flow between the actuating rod 16d, which centrally extends through the piston rod 12a of the second piston 12 of the actuator 10, at least partially or in sections, and the control element of the emergency control device provided for displacing the actuating rod 16d.

Modifications and variations can be made to the embodiments illustrated or described herein without departing from the scope and spirit of the invention as set forth in the appended claims. In the claims, reference characters corresponding to elements recited in the detailed description and the drawings may be recited. Such reference characters are enclosed within parentheses and are provided as an aid for reference to example embodiments described in the detailed description and the drawings. Such reference characters are provided for convenience only and have no effect on the scope of the claims. In particular, such reference characters are not intended to limit the claims to the particular example embodiments described in the detailed description and the drawings.

REFERENCE CHARACTERS 1 parking interlock gear
1a tooth space of the locking toothing of the parking interlock gear
2 locking pawl
2a ratchet tooth of the locking pawl
3 pawl pin
4 selector lever
4a driving part of the selector lever
5 connecting bar
6 interlocking element; locking cone
7 spring element
8 guiding plate
9 engagement spring
10 actuator
11 first piston of the actuator
12 second piston of the actuator
12a piston rod of the second piston
12b pin for driving part
12c pin for inner lever
12d engagement section of the piston rod of the second piston
12e open space of the piston rod of the second piston
12f mating surface of the piston rod of the second piston
12g cavity of the second piston
12h bush of the second piston
13 detent device
13a electromagnet of the detent device
13b armature rod of the electromagnet
13c recess of the armature rod
13d recoil spring of the armature rod
13e housing of the electromagnet
14 actuator housing
14a pressure chamber in the actuator housing
15 emergency disengagement device
15a actuating element of the emergency disengagement device
15a1 angled section of the actuating element of the emergency disengagement device
15b inner lever of the emergency disengagement device
15b1 leg of the inner lever
15b2 shaft
16 emergency engagement device
16a actuating element of the emergency engagement device
16b1 lever of the emergency engagement device
16b2 lever of the emergency engagement device
16b3 sleeve of the emergency engagement device
16b4 sleeve of the emergency engagement device
16b5 mounting of the sleeve
16b6 driving device
16b7 selector fork of the emergency engagement device
16b8 forked end of the selector fork
16c1 bowden cable of the emergency engagement device
16c2 counter support of the bowden cable
16c3 push rod of the emergency engagement device
16c4 bearing of the push rod
16c5 mating surface of the push rod
16c6 recoil spring of the push rod
16d actuating rod of the emergency engagement device
16e bearing of the actuating rod
16f compensation spring of the emergency engagement device; spring of the actuating rod
16g open space
16h deflection roller
17 emergency control device
17a handle of the emergency control device
17b swivel joint of the emergency control device
17c inner lever of the emergency control device
17c1 leg of the inner lever
17c2 shaft
18 transmission housing wall
19 oil pan wall
F_aus_not actuation force during the emergency release of the parking lock
F_ein_not actuation force during the emergency engagement of the parking lock
Not_0 basic control position
Not_1 first emergency control position
Not_2 second emergency control position
P_aus disengaged condition of the parking lock
P_aus_not disengaged condition of the parking lock after actuation of the emergency disengagement device
P_ein engaged condition of the parking lock P_ein_not an engaged condition of the parking lock after actuation of the emergency engagement device
R direction of rotation of the actuating element
R_aus_not direction of rotation of the inner lever during the emergency disengagement of the parking lock
R_ein_not direction of rotation of the inner lever during the emergency engagement of the parking lock
T translation direction of the actuating element

The invention claimed is:

1. A parking lock for an automatic transmission in a motor vehicle, comprising:
   a parking interlock gear (1) connected to a transmission shaft, the parking interlock gear (1) comprising a locking toothing with tooth spaces (1a);
   a locking pawl (2) pivotably mounted on a pawl pin (3), the locking pawl (2) comprising a ratchet tooth (2a), the ratchet tooth (2a) engaging into one of the tooth spaces (1a) of the parking interlock gear (1) in an engaged condition (P_ein) of the parking lock in order to interlock the parking interlock gear (1) and the transmission shaft against rotation;
   a selector lever (4) rotatable about a selector-lever axis of rotation (3a) in order to specify an engagement position (P_ein, P_aus) of the parking lock;
   a connecting bar (5) comprising an interlocking element (6) spring-mounted counter to a parking lock disengagement direction, the interlocking element (6) engaging the ratchet tooth (2a) of the locking pawl (2) into the one of the tooth spaces (1a) of the parking interlock gear (1) during engagement of the parking lock, the interlocking element (6) preventing the ratchet tooth (2a) of the locking pawl (2) from exiting the one of the tooth spaces (1a) of the parking interlock gear (1) in the engaged condition (P_ein) of the parking lock, an end of the connecting bar (5) facing away from the interlocking element (6) articulatedly connected to the selector lever (4);
   a spring (9) arranged such that a spring force of the spring (9) acts upon the selector lever (4) in a parking lock engagement direction;
   a hydraulic actuator (10) operable such that a compressive force of the actuator (10) urges the selector lever (4) in the parking lock disengagement direction, the actuator (10) comprising a first piston (11) and a second piston (12) displaceably arranged, axially one behind the other, on a common longitudinal axis in an actuator housing (14), the first piston (11) hydraulically pressurizable to disengage the parking lock, the first piston (11) axially displacing the second piston (12) against the spring force of the spring (9) upon pressurization, the second piston (12) mechanically connected to the selector lever (4) such that an axial movement of the second piston (12) rotates the selector lever (4) about the selector-lever axis of rotation (3a) and vice versa;
   a detent device (13) actuatable by an electromagnet (13a), the detent device (13) operable to mechanically fix the first piston (11) either in a piston position associated with the engaged condition (P_ein) of the parking lock or in a piston position associated with the disengaged condition (P_aus) of the parking lock;
   a manually operable emergency disengagement device (15) configured to axially displace the second piston (12), without the need to activate the electromagnet (13a), in order to release the detent device (13); and
   a manually operable emergency engagement device (16) configured to mechanically release the detent device (13) from a detent position fixing the first piston (11) such that the first piston (11) is axially displaceable via the spring force of the spring (9), without the need to activate the electromagnet (13a), in order to release the detent device (13).

2. The parking lock of claim 1, wherein the emergency disengagement device (15) and the emergency engagement device (16) are mechanically coupled to each other via a common, manually operable emergency control device (17) in such that:
   starting from a basic control position (Not_0) associated with the normal operation of the automatic transmission, a first emergency control position (Not_1) is manually selectable, only the emergency engagement device (16) is actuated in the first emergency control position (Not_1); and
   starting from the first emergency control position (Not_1), a second emergency control position (Not_2) is manually selectable, both the emergency engagement device (16) and the emergency disengagement device (15) are actuated in the second emergency control position (Not_2).

3. The parking lock of claim 2, wherein the common emergency control device (17) is rotatable between the basic control position (Not_0) and the first emergency control position (Not_1), and the common emergency control device (17) is translatable between the first emergency control position (Not_1) and the second emergency control position (Not_2).

4. The parking lock of claim 3, further comprising means to prevent a start of a prime mover of the motor vehicle in the second emergency control position (Not_2).

5. The parking lock of claim 4, wherein the means are an integral part of the emergency control device (17).

6. The parking lock of claim 2, wherein the emergency control device (17) comprises a haptic interlock configured to block shifting from the first emergency control position (Not_1) unless the haptic interlock is overcome.

7. The parking lock of claim 2, wherein the emergency control device (17) comprises a haptic interlock configured to block shifting from the basic control position (Not_0) unless the haptic interlock is overcome.

8. The parking lock of claim 2, wherein the emergency control device (17) is lockable in the first emergency control position (Not_1) and in the second emergency control position (Not_2).

9. The parking lock of claim 1, wherein the emergency disengagement device (15) and the emergency engagement device (16) are mechanically coupled to each other via a common, manually operable emergency control device (17) such that, starting from a basic control position (Not_0) associated with the normal operation of the automatic transmission, either the emergency disengagement device (15) or the emergency engagement device (16) of the parking lock is manually selectable.

10. The parking lock of claim 9, wherein the emergency control device (17) comprises an inner lever (17c) arranged within a transmission housing and a manually actuatable outer lever arranged outside the transmission housing, wherein:
   the inner lever (17c) and the outer lever are rotationally fixed to each other via a shaft (17c2) extending through the transmission housing;
   the inner lever (17c) is configured to, depending on an engagement position of the inner lever (17c),
   release the detent device (13) from the detent position fixing the first piston (11) of the actuator (10),
   exert no influence upon the parking lock, or move the second piston (12) of the actuator (10) together with the selector lever (4) in order to disengage the parking lock.

11. The parking lock of claim 1, wherein the emergency disengagement device (15) and the emergency engagement device (16) are operable independently of each other.

12. The parking lock of claim 1, wherein an actuating element (15a) of the emergency disengagement device (15), which acts upon the second piston (12) of the actuator (10) during emergency disengagement of the parking lock, extends through a transmission housing wall (18) of the automatic transmission, and an actuating element (16a) of the emergency engagement device (16), which acts upon the detent device (13) during the emergency engagement of the parking lock, also extends through the transmission housing wall (18) of the automatic transmission.

13. The parking lock of claim 11, wherein an actuating element (15a) of the emergency disengagement device (15) acting upon the second piston (12) during emergency disengagement of the parking lock extends through a transmission housing wall (18) of the automatic transmission, and an actuating element (16a) of the emergency engagement device (16) acting upon the detent device (13) during the emergency engagement of the parking lock extends through an oil pan wall (19) of the automatic transmission.

14. The parking lock of claim 2, wherein the emergency control device (17) is lockable in the basic control position (Not_0).

15. The parking lock of claim 1, wherein the emergency engagement device (16) comprises an emergency interlock compensation spring (16f), the emergency interlock compensation spring (16f) configured to limit travel and/or force during and/or after release of the detent device (13) from a locked position of the detent device (13).

16. The parking lock of claim 1, wherein the emergency engagement device (16) is configured to mechanically acts upon an armature rod (13b) of the electromagnet (13a) and, via the armature rod (13b), upon the detent device (13) during emergency engagement of the parking lock.

17. The parking lock of claim 16, wherein the emergency engagement device (16) is configured to act upon a side of the armature rod (13b) facing away from the second piston (12) during the emergency engagement of the parking lock.

18. The parking lock of claim 17, wherein the emergency engagement device (16) comprises a lever (16b1) for actuating the armature rod (13b), the lever (16b1) articulatedly connected to a housing (13e) of the electromagnet (13a), the level (16b1) comprising two opposite free ends, a first free end of the lever (16b1) articulatedly connected to the armature rod (13b) of the electromagnet (13a), a second free end of the lever (16b1) comprising a supporting fixture for an actuator of the emergency engagement device (16).

19. The parking lock of claim 18, wherein the actuator is inserted into the lever (16b1) with an open space (16g) that is greater than an axial displacement of the electromagnet (13a) upon energization such that an energization of the electromagnet (13a) during normal operation does not result in a movement of the actuator.

20. The parking lock of claim 17, wherein:
the emergency engagement device (16) comprises a lever (16b2) for actuating the armature rod (13b), the lever (16b2) articulatedly connected to a housing (13e) of the electromagnet (13a), the lever (16b2) comprising two opposite free ends, a first free end of the lever (16b2) loosely engaging into a driving section of the armature rod (13b) of the electromagnet (13a), a second free end of the lever (16b2) comprising a supporting fixture for an actuator of the emergency engagement device (16);
wherein the driving section of the armature rod (13b) has a length along a longitudinal direction of the armature rod (13b), and the length of the driving section of the armature rod (13b) is greater than an axial displacement of the electromagnet (13a) upon energization such that an energization of the electromagnet (13a) during normal operation does result in a swiveling motion of the lever (16b2).

21. The parking lock of claim 17, wherein:
the emergency engagement device (16) comprises a cup-shaped sleeve (16b3) for actuating the armature rod (13b), the cup-shaped sleeve (16b3) axially displaceably mounted on or at the electromagnet (13a) and at least partially concentrically surrounding the electromagnet (13a);
a cup base of the sleeve (16b3) is fixedly connected to the armature rod (13b) of the electromagnet (13a);
an actuator of the emergency engagement device (16) acts upon a shell surface of the sleeve (16b3) upon actuation of the emergency engagement device (16);
the actuator axially displaces the sleeve (16b3) and the armature rod (13b) to an extent that the detent device (13) exits the detent position upon actuation of the emergency engagement device (16), and
during normal operation, the armature rod (13b) of the electromagnet (13a), upon energization, transfers no axial loads onto the actuating means.

22. The parking lock of claim 17, wherein:
the emergency engagement device (16) comprises a cup-shaped sleeve (16b4) for actuating the armature rod (13b), the cup-shaped sleeve (16b4) axially displaceably mounted on or at the electromagnet (13a) and at least partially concentrically surrounding the electromagnet (13a);
the armature rod (13b) centrally axially displaceably extends through a cup base of the sleeve (16b4), and the armature rod (13b) comprises a driving device (16b6) cooperating with the cup base of the sleeve (16b4) at an end of the armature rod (13b) extending through the cup base, and the sleeve (16b4) configured to axially displace the armature rod (13b) via the driving device (16b6);
an open space (16g) is provided axially between the cup base and the driving device (16b6), the open space (16g) is greater than an axial displacement of the electromagnet (13a) upon energization such that an energization of the electromagnet (13a) during normal operation does not result in an axial movement of the sleeve (16b4); and
an actuator of the emergency engagement device (16) acts upon the shell surface of the sleeve (16b4) upon actuation of the emergency engagement device (16).

23. The parking lock of claim 17, wherein:
the emergency engagement device (16) for actuating the armature rod (13b) comprises a selector fork (16b7), the selector fork (16b7) axially displaceably arranged on a side of the electromagnet (13a) facing away from the detent device (13), the selector fork (16b7) loosely hung into a driving device (16b6) of the armature rod (13b) via a forked end (16b8) of the selector fork (16b7);
the armature rod (13b) axially displaceably extends through the forked end (16b8) of the selector fork (16b7) along an axial direction of the armature rod (13b);

the selector fork (16b7) is configured to axially displace the armature rod (13b) via the driving device (16b6);

an open space (16g) is provided axially between the forked end (16b8) of the selector fork (16b7) and the driving device (16b6) of the armature rod (13b), the open space (16g) is greater than an axial displacement of the electromagnet (13a) upon energization such that an energization of the electromagnet (13a) during normal operation does not result in an axial movement of the selector fork (16b7); and an actuator of the emergency engagement device (16) acts upon the selector fork (16b7) upon actuation of the emergency engagement device (16).

24. The parking lock of claim 17, wherein an actuator of the emergency engagement device (16) is an inner cable of a Bowden cable (16c1), and a sheath of the Bowden cable (16c1) rests against a housing (13e) of the electromagnet (13a) or against the actuator housing (14).

25. The parking lock of claim 17, wherein an actuator of the emergency engagement device (16) is a push rod (16c3), and the push rod (16c3) extends axially parallel to the armature rod (13b) and is axially displaceably mounted at the actuator housing (14) and/or at a housing (13e) of the electromagnet (13a).

26. The parking lock of claim 17, wherein an actuator of the emergency engagement device (16) is a pull rod, and the pull rod is axially displaceably mounted at the actuator housing (14) and/or at a housing (13e) of the electromagnet (13a).

27. The parking lock of claim 16, wherein the emergency engagement device (16) is configured to act upon a side of the armature rod (13b) facing the second piston (12) of the actuator (10) during emergency engagement of the parking lock.

28. The parking lock of claim 27, wherein the emergency engagement device (16) comprises an actuating rod (16d) for actuating the armature rod (13b), and the actuating rod (16d) centrally extends through a piston rod (12a) of the second piston (12), at least partially.

29. The parking lock of claim 28, wherein the actuating rod (16d) is a separate component, and the actuating rod (16d) is axially displaceably mounted in the second piston (12) or in the piston rod (12a) of the second piston (12).

30. The parking lock of claim 28, wherein the actuating rod (16d) is permanently connected to the armature rod (13b) of the electromagnet (13a) or is an integral element of the armature rod (13b) of the electromagnet (13a).

31. The parking lock of claim 30, wherein the actuating rod (16d) is axially displaceably mounted in the second piston (12) or in the piston rod (12a) of the second piston (12).

32. The parking lock of claim 28, wherein:

the selector lever (4) comprises a U-shaped driving section including two plane-parallel legs, the piston rod (12a) and the selector lever (4) are connected to each other proximate the two plane-parallel legs; and the piston rod (12a) extends between the two plane-parallel legs of the selector lever (4) along an axial direction of the piston rod (12a).

33. The parking lock of claim 1, wherein, upon actuation of the emergency disengagement device (15), an actuating element (15a) of the emergency disengagement device (15) mechanically acts directly upon the selector lever (4), and the actuating element (15a) is arranged within the transmission housing (20) of the automatic transmission.

34. The parking lock of claim 1, wherein, upon actuation of the emergency disengagement device (15), an actuating element (15a) of the emergency disengagement device (15) mechanically acts directly upon the piston rod (12a) of the second piston (12), the actuating element (15a) also mechanically acts upon the selector lever (4) via the piston rod (12a), and the actuating element (15a) is arranged within the transmission housing (20) of the automatic transmission.

35. The parking lock of claim 1, wherein the electromagnet (13a) is configured such that the electromagnet (13a) must be electrically energized in order to release the detent device (13) from the locked position.

36. The parking lock of claim 1, wherein the electromagnet (13a) is configured such that the electromagnet (13a) must be electrically de-energized in order to release the detent device (13) from the locked position.

* * * * *